United States Patent
Tanaka et al.

(10) Patent No.: US 9,749,055 B2
(45) Date of Patent: Aug. 29, 2017

(54) OPTICAL TRANSMITTER AND OPTICAL TRANSMISSION METHOD

(71) Applicant: FUJITSU LIMITED, Kawasaki-shi, Kanagawa (JP)

(72) Inventors: Toshiki Tanaka, Setagaya (JP); Tomoo Takahara, Kawasaki (JP); Masato Nishihara, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 70 days.

(21) Appl. No.: 14/476,307

(22) Filed: Sep. 3, 2014

(65) Prior Publication Data

US 2014/0369677 A1 Dec. 18, 2014

Related U.S. Application Data

(63) Continuation of application No. PCT/JP2012/056868, filed on Mar. 16, 2012.

(51) Int. Cl.
*H04B 10/516* (2013.01)
*H04B 14/02* (2006.01)
(Continued)

(52) U.S. Cl.
CPC ........... *H04B 10/516* (2013.01); *H04B 10/07* (2013.01); *H04B 10/50* (2013.01); *H04B 10/572* (2013.01);
(Continued)

(58) Field of Classification Search
CPC .... H04B 10/516; H04B 10/572; H04B 10/07; H04B 10/50; H04L 5/0094; H04L 5/0064; H04L 5/006; H04L 5/0046
See application file for complete search history.

(56) References Cited

U.S. PATENT DOCUMENTS 6,259,746 B1 7/2001 Levin et al.
7,852,957 B2 12/2010 Kato
(Continued)

FOREIGN PATENT DOCUMENTS

EP 1164740 A2 12/2001
EP 2066044 A1 6/2009
(Continued)

OTHER PUBLICATIONS

EESR—Extended European Search Report issued in corresponding European Patent Application No. 12870962.3, mailed on Apr. 16, 2015.
(Continued)

*Primary Examiner* — Leslie Pascal
(74) *Attorney, Agent, or Firm* — Fujitsu Patent Center

(57) ABSTRACT

An optical transmitter converts a plurality of transmission signals transmitted via a plurality of lanes into a multi-carrier signal and transmits the multi-carrier signal. The optical transmitter includes: a controller configured to generate allocation information that indicates an allocation of sub-carriers to the plurality of lanes according to a bit rate of the transmission signal of each of the lanes and a possible transmission capacity of each of the sub-carriers; and a signal processor configured to convert the plurality of transmission signals into the multi-carrier signal in accordance with the allocation information generated by the controller.

11 Claims, 20 Drawing Sheets

(51) Int. Cl.
*H04L 5/00* (2006.01)
*H04B 10/07* (2013.01)
*H04B 10/572* (2013.01)
*H04B 10/50* (2013.01)
*H04J 14/02* (2006.01)

(52) U.S. Cl.
CPC .......... *H04J 14/0298* (2013.01); *H04L 5/006* (2013.01); *H04L 5/0046* (2013.01); *H04L 5/0064* (2013.01); *H04L 5/0094* (2013.01)

(56) References Cited

U.S. PATENT DOCUMENTS

| | | | |
|---|---|---|---|
| 2004/0120347 A1* | 6/2004 | Lee | H04J 3/1682 370/468 |
| 2005/0002324 A1* | 1/2005 | Sutivong | H04L 1/20 370/208 |
| 2006/0198293 A1 | 9/2006 | Nishio et al. | |
| 2008/0056184 A1* | 3/2008 | Green | H04L 5/023 370/329 |
| 2010/0232786 A1 | 9/2010 | Aoki et al. | |
| 2014/0161050 A1* | 6/2014 | Grinshpun | H04L 65/4069 370/329 |
| 2015/0372762 A1* | 12/2015 | Zhang | H04B 10/5161 398/26 |

FOREIGN PATENT DOCUMENTS

| | | |
|---|---|---|
| JP | 11-317723 | 11/1999 |
| JP | 2005-341458 | 12/2005 |
| JP | 2010-28549 | 2/2010 |
| JP | 2010-213184 | 9/2010 |
| JP | 2010-219949 | 9/2010 |
| JP | 2010-245809 | 10/2010 |
| WO | 2006-080180 | 8/2006 |

OTHER PUBLICATIONS

Notification of Transmittal of Translation of the International Preliminary Report on Patentability (Form PCT/IB/338, Form PCT/IB/373 & Form PCT/ISA/237), PCT/JP2012/056868, 6 pages, dated Sep. 25, 2014.

International Search Report, mailed in connection with PCT/JP2012/056868 and mailed May 29, 2012.

Wei, J. L et al., "7dB Optical Power Budget Improvements of 11.25Gb/s Optical OFDM PON system Using Optical Filters", OMG1, OSA/OFC/NFOEC 2011 (3 pages).

Milion, C. et al., "High Bit Rate Transmission for NG-PON by Direct Modulation of DFB Laser using Discrete Multi-Tone", Paper 7.5.4, ECOC 2009, Sep. 20-24, 2009 (2 pages).

JPOA—Office Action of Japanese Patent Application No. 2014-504592 dated Jul. 7, 2015, with English translation of the relevant part, p. 1 lines 27-36 of the Office Action.

* cited by examiner

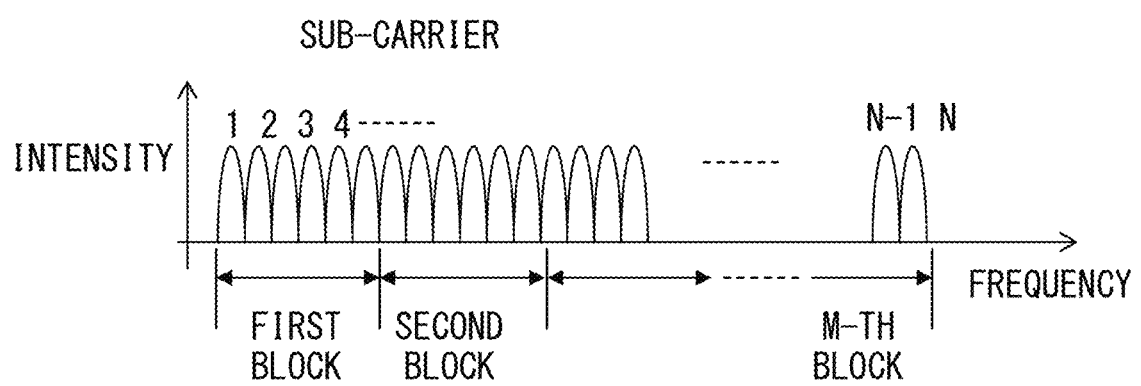
F I G. 5

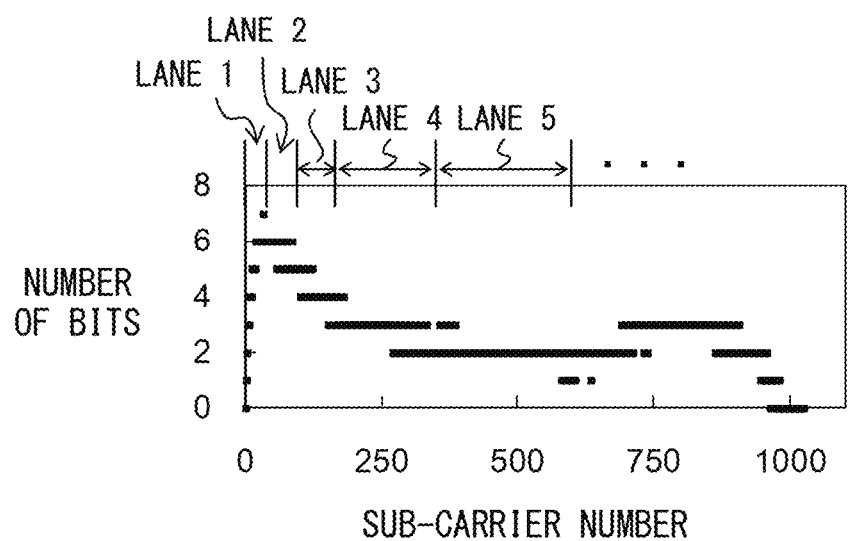
F I G. 7

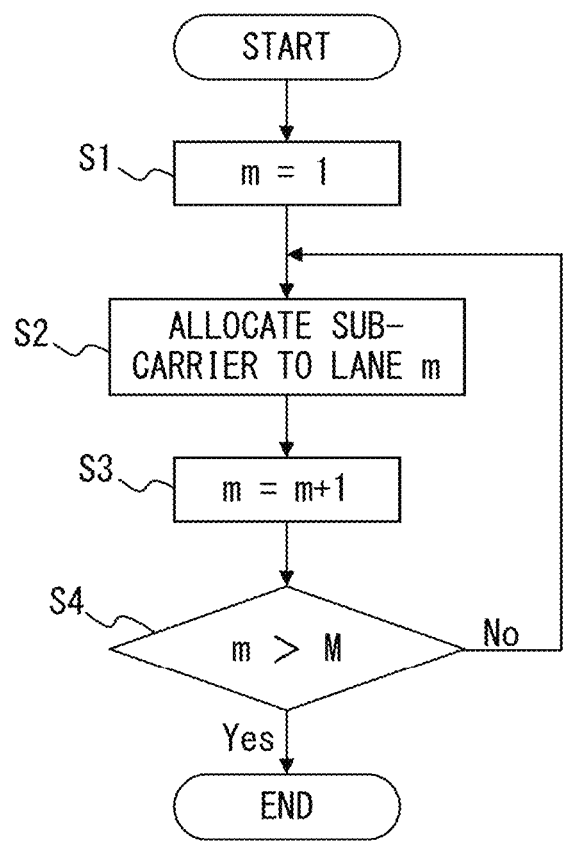
F I G. 8

| LANE ID | SUB-CARRIER NUMBER | CAPACITY (NUMBER OF BITS) | MODULATION SCHEME |
|---|---|---|---|
| 1 | 1 | 6 | 64QAM |
|  | 2 | 6 | 64QAM |
|  | 3 | 5 | 32QAM |
|  | 4 | 5 | 32QAM |
|  | ⋮ | ⋮ |  |
|  | 79 | 5 | 32QAM |
| 2 | 80 | 5 | 32QAM |
|  | 81 | 5 | 32QAM |
|  | ⋮ | ⋮ |  |
|  | 175 | 4 | 16QAM |
| ⋮ | ⋮ |  |  |
| M | 850 | 3 | 8PSK |
|  | 851 | 3 | 8PSK |
|  | ⋮ |  |  |

FIG. 10

| TRANSMISSION SYSTEM INFORMATION PARAMETER ||| NUMBER OF ALLOCATED BITS FOR EACH SUB-CARRIER |||||||
|---|---|---|---|---|---|---|---|---|
| TRANSMISSION DISTANCE | WAVELENGTH BAND | CHROMATIC DISPERSION | ... | SC-No. 1 | SC-No. 2 | SC-No. 3 | ... | SC-No. 1023 | SC-No. 1024 |
| 10km | 1310nm | 10ps/nm | ... | 6bit | 6bit | 6bit | ... | 4bit | 4bit |
| 10km | 1550nm | 170ps/nm | ... | 6bit | 6bit | 5bit | ... | 3bit | 2bit |
| 20km | 1550nm | 340ps/nm | ... | 5bit | 5bit | 4bit | ... | 2bit | 2bit |
| ... | ... | ... | ... | ... | ... | ... | ... | ... | ... |

FIG. 14

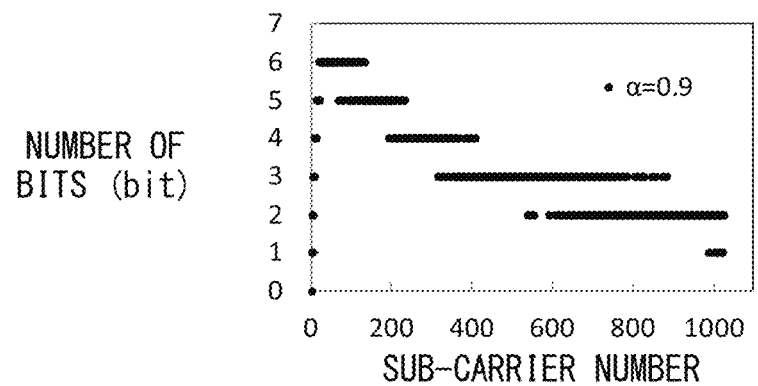
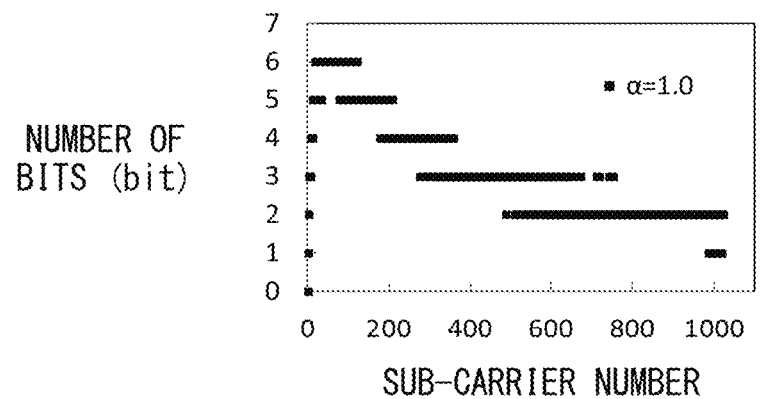
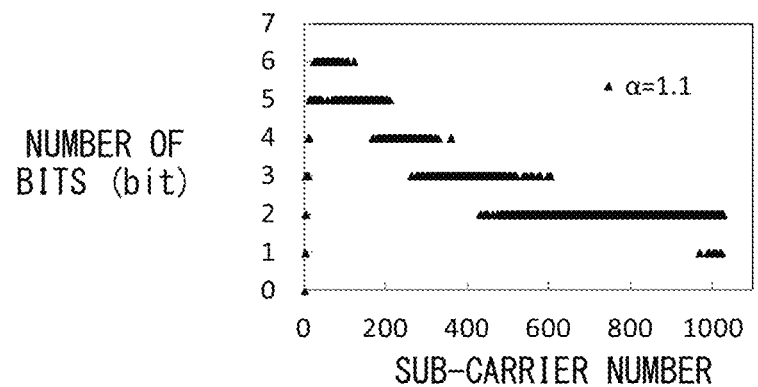
F I G. 19

OPTICAL TRANSMITTER AND OPTICAL TRANSMISSION METHOD

CROSS-REFERENCE TO RELATED APPLICATION

This application is a continuation application of International Application PCT/JP2012/056868 filed on Mar. 16, 2012 and designated the U.S., the entire contents of which are incorporated herein by reference.

FIELD

The embodiments discussed herein are related to a device that transmits a multi-carrier signal and a method thereof.

BACKGROUND

In an optical transmission system, a device that multiplexes signals transmitted via a plurality of lanes and transmits a multiplexed signal via one lane is in practical use. For example, in a network illustrated in FIG. 1, a node device 100 multiplexes client signals transmitted from a plurality of clients C1-C4 and transmits a multiplexed signal to a metro system network.

In a long-distance trunk system, the Multi-Lane Distribution (MLD) that is performed in an Optical Transport Network (OTN) is known. In the Multi-Lane Distribution, a skew between parallel signals is adjusted, and a serial transmission signal is generated. However, in an access system network and/or the metro system network, a configuration simpler than the Multi-Lane Distribution of the OTN is requested in some cases.

FIG. 2 illustrates an example of a conventional optical transceiver. The optical transceiver illustrated in FIG. 2 transmits an optical signal of 100 Gbps obtained by multiplexing ten data signals of 10 Gbps. In addition, the optical transceiver reproduces the ten data signals of 10 Gbps from the received optical signal of 100 Gbps. Each of the data signals of 10 Gbps is, for example, a 10 GbE signal. The optical signal of 100 Gbps is, for example, a 100 GbE signal.

A gear box converts a transmission speed and the number of transmission lanes in an electric domain. For example, a gear box 201 converts ten input lanes into four intermediate lanes. In this case, each of the input lanes transmits a 10 Gbos data signal, and each of the intermediate lanes transmits a 25 Gbps signal. Each transmitter Tx converts a signal of a corresponding one of the intermediate lanes into an optical signal. Wavelengths (λ1-λ4) of the optical signals generated by the respective transmitters Tx are different from each other. Then, an optical multiplexer multiplexes a plurality of optical signals and generates a 100 Gbps optical signal. The 100 Gbps optical signal is a WDM optical signal. An optical demultiplexer demultiplexes the 100 Gbps optical signal for each wavelength. Each receiver Rx converts a corresponding optical signal obtained by the optical demultiplexer into an electric signal. Each of the electric signals is guided to a gearbox 202 via the intermediate lane. Then, the gear box 202 converts the four intermediate lanes into ten output lanes. As a result, the 10 Gbps data signals are transmitted to respective clients.

FIG. 3 illustrates an example of a configuration of an optical transmission system using an OFDM (Orthogonal Frequency Division Multiplexing) base intensity modulation scheme. In a transmitter of the optical transmission system, user data is converted into an OFDM signal by a modulator (mapper), an inverse Fourier transformer (IFFT), a serializer, and a D/A converter. An optical OFDM signal is generated by driving a light source by the OFDM signal. The optical OFDM signal is transmitted via an optical fiber. In a receiver, the optical OFDM signal is converted into an electric signal. Then, the user data is reproduced from the electric signal by an A/D converter, a deserializer, a Fourier transformer (FFT), and a demodulator (demapper). In the OFDM, data is transmitted using a plurality of sub-carriers.

A technique relating to the optical OFDM is described in, for example, Non-Patent Document 1. In addition, Non-Patent Document 2 describes a relevant technique. Further, Patent Document 1 describes a frame transfer device including a transfer unit, a frame generator, and a multiplex transmitter. The transfer unit transfers in parallel client signals using a plurality of lanes. The frame generator, that is provided in each of the plurality of lanes, accommodates a client signal from the transfer unit in an accommodation frame corresponding to a bit rate of each of the lanes without performing a multi-lane distribution termination process on the client signal. The multiplex transmitter multiplexes a plurality of frames generated by the frame generators, and transmits a multiplexed frame.

Patent Document 1: Japanese Laid-open Patent Publication No. 2010-213184
Non-Patent Document 1: J. L. Wei, et al., "7 dB Optical Power Budget Improvements of 11.25 Gb/s Optical OFDM PON system Using Optical Filters", OMG1, OFC2011
Non-Patent Document 2: C. Milion, et al., "High Bit Rate Transmission for NG-PON by Direct Modulation of DFB Laser using Discrete Multi-Tone", Paper 7.5.4, ECOC 2009, 20-24 September, 2009

When a plurality of transmission signals transmitted via a plurality of lanes are multiplexed so as to generate an optical signal, in the conventional technique illustrated in FIG. 2, a gearbox that converts a transmission speed and the number of transmission lanes is used. However, the gear box consumes large power. In addition, the gear box has a large size of circuit When the optical OFDM illustrated in FIG. 3 is used, in order to multiplex a plurality of transmission signals transmitted via a plurality of lanes so as to generate an optical signal, it is needed that the plurality of transmission signals are converted into serial data signals using a gear box, and the serial data signals are input into an OFDM modem. Therefore, also in this case, the gear box is needed, and therefore the problem of consumption power and/or a circuit size is not solved.

SUMMARY

According to an aspect of the invention, an optical transmitter converts a plurality of transmission signals transmitted via a plurality of lanes into a multi-carrier signal and transmits the multi-carrier signal. The optical transmitter includes: a controller configured to generate allocation information that indicates an allocation of sub-carriers to the plurality of lanes according to a bit rate of the transmission signal of each of the lanes and a possible transmission capacity of each of the sub-carriers; and a signal processor configured to convert the plurality of transmission signals into the multi-carrier signal in accordance with the allocation information generated by the controller.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a diagram explaining the allocation of a sub-carrier.

FIG. 7 is a diagram explaining a possible transmission capacity of a sub-carrier.

FIG. 8 is a flowchart illustrating an outline of a method for allocating a sub-carrier.

FIG. 10 illustrates an example of allocation information.

FIG. 14 illustrates an example of a lookup table.

FIG. 19 illustrates a possible transmission capacity of each sub-carrier with respect to a chirp coefficient $\alpha$.

DESCRIPTION OF EMBODIMENTS

Figure 4:
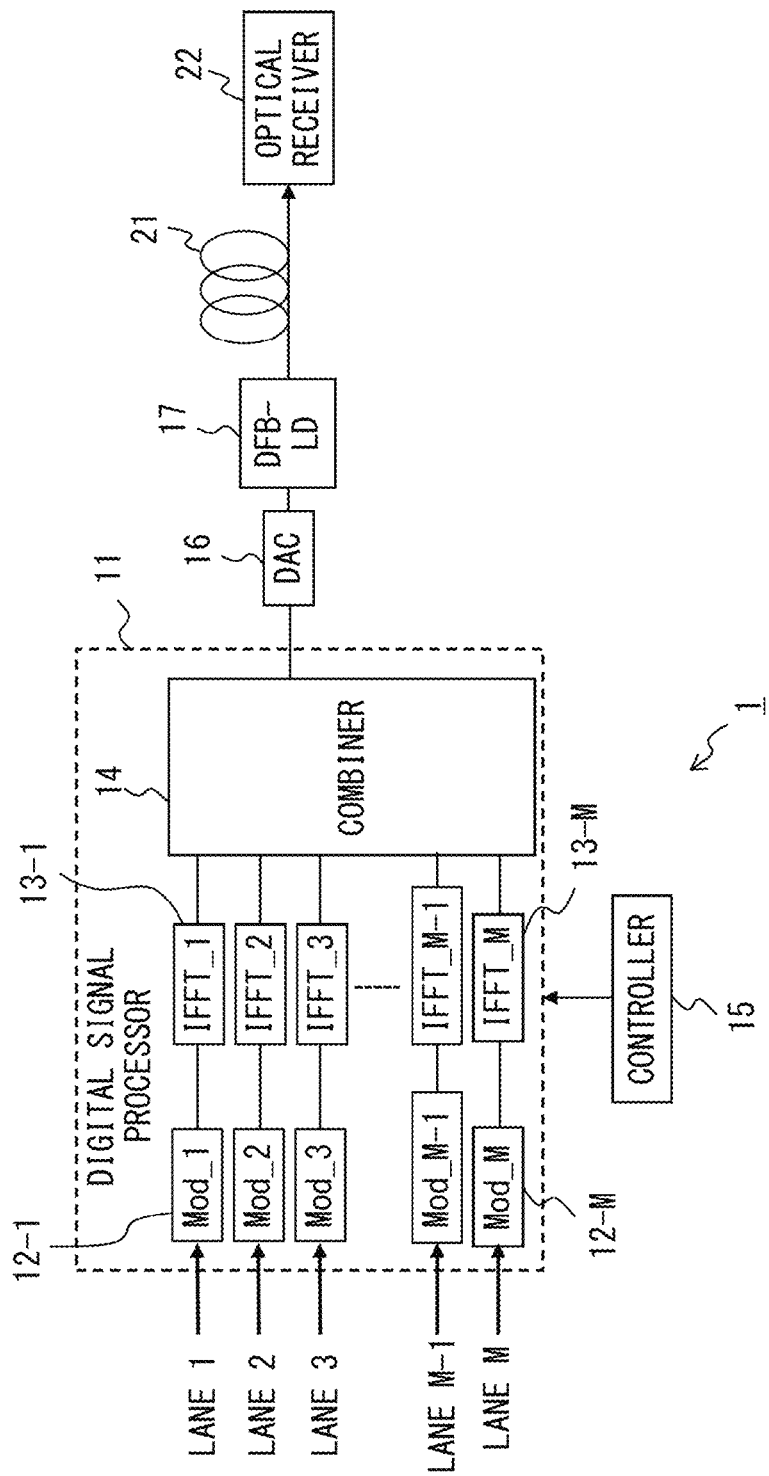
FIG. 4 illustrates a configuration of an optical transmitter according to the embodiments of the present invention.

FIG. 4 illustrates a configuration of an optical transmitter according to the embodiments of the present invention. The optical transmitter 1 according to the embodiments receives transmission signals via a plurality of lanes and transmits the transmission signals using a plurality of sub-carriers.

The transmission signal is not particularly limited, and may be, for example, a bit stream or a frame. In the description below, a signal transmitted via each lane is referred to as a data signal.

As illustrated in FIG. 4, the optical transmitter 1 according to the embodiments includes a digital signal processor 11, a controller 15, a D/A converter (DAC: Digital-to-Analog Converter) 16, and a light source (DFB-LD: Distributed Feed-Back Laser Diode) 17. In addition, in the example illustrated in FIG. 4, a plurality of lanes 1-M are connected to the optical transmitter 1. The "lane" is realized by a physical transmission medium that transmits a signal. In this example, the lanes 1-M respectively transmit an electric signal. Bit rates of data signals transmitted via the respective lanes 1-M may be the same as each other or be not the same as each other. As an example, a bit rate of each of the lanes 1-M is 10 Gbps. In this case, traffic of each of the lanes 1-M is, for example, a 10 GbE signal.

The digital signal processor 11 includes a plurality of modulators (Mod) 12-1 to 12-M, a plurality of inverse Fourier transformers (IFFT: Inverse Fast Fourier Transform) 13-1 to 13-M, and a combiner 14. The modulators 12-1 to 12-M are respectively provided corresponding to the lanes 1-M. The plurality of inverse Fourier transformers 13-1 to 13-M are respectively provided corresponding to the modulators 12-1 to 12-M.

The digital signal processor 11 transmits data using a plurality of sub-carriers. Namely, the digital signal processor 11 transmits data using a multi-carrier signal. In an example illustrated in FIG. 5, the digital signal processor transmits data using sub-carriers 1-N. N is not particularly limited, but is, for example, several tens to several thousands. In the description below, an example in which N=1024 is sometimes provided. In addition, it is preferable that the sub-carriers 1-N are orthogonal to each other.

In this specification, assume that the sub-carriers 1-N are arranged in order on a frequency axis, as illustrated in FIG. 5. Namely, a frequency of a sub-carrier that has a small sub-carrier number is low, and a frequency of a sub-carrier that has a large sub-carrier number is high.

The sub-carriers 1-N are divided into M blocks and are allocated to the lanes 1-M. For example, sub-carriers belonging to a first block are allocated to the lane 1, and sub-carriers belonging to an M-th block are allocated to the lane M. The allocation of the sub-carrier is determined according to a bit rate of a data signal of each of the lanes and a possible transmission capacity of each of the sub-carriers, which is described below in detail. In the example illustrated in FIG. 5, all of the sub-carriers 1-N are allocated to any one of the lanes, but the optical transmitter 1 does not necessarily need to use all of the sub-carriers 1-N.

Each of the modulators 12-1 to 12-M modulates a sub-carrier allocated to a corresponding lane by a data signal of the corresponding lane. Namely, each of the modulators 12-1 to 12-M generates a sub-carrier modulated signal from the data signal of the corresponding lane. Here, a plurality of sub-carriers are allocated to each of the lanes. Therefore, each of the modulators 12-1 to 12-M generates a plurality of sub-carrier modulated signals from the data signal of the corresponding lane.

Each of the inverse Fourier transformers 13-1 to 13-M transforms the plurality of sub-carrier modulated signals generated by the corresponding one of the modulators 12-1 to 12-M into a time domain signal. In this transform, each of the inverse Fourier transformers 13-1 to 13-M generates the time domain signal by performing inverse Fourier transformation on the plurality of sub-carrier modulated signals generated by the corresponding one of the modulators 12-1 to 12-M. Each of the inverse Fourier transformers 13-1 to 13-M may include a serializer that transforms a plurality of output signals obtained by the inverse Fourier transformation into a serial signal.

For example, when 100 sub-carriers are allocated to the lane 1, the modulator 12-1 generates 100 sub-carrier modulated signals. Then, the inverse Fourier transformer 13-1 generates a time domain signal from the 100 sub-carrier modulated signals obtained by the modulator 12-1.

The combiner 14 combines the plurality of time domain signals generated by the inverse Fourier transformers 13-1 to 13-M and generates a multi-carrier signal. Combining of the plurality of time domain signals is realized, for example, by adding together the plurality of time domain signals (or, calculating a sum).

In one embodiment, the digital signal processor 11 includes a processor and a memory. In this case, the digital signal processor 11 provides functions of the modulators 12-1 to 12-M, the inverse Fourier transformers 13-1 to 13-M, and the combiner 14 by executing a given program. In addition, the digital signal processor 11 may include a hardware circuit. Namely, the digital signal processor 11 may be implemented by using software and hardware.

The D/A converter 16 converts the multi-carrier signal generated by the digital signal processor 11 into an analog signal. The light source 17 is driven by the analog multi-carrier signal obtained by the D/A converter 16. As a result, a multi-carrier optical signal is generated that transmits a plurality of data signals received via the plurality of lanes. The multi-carrier optical signal is transmitted via an optical transmission line 21. The optical transmission line 21 is an optical fiber. In addition, one or a plurality of optical repeaters or optical amplifiers may be provided in the optical transmission line 21. Note that the light source 17 is not limited to a DFB-LD.

The optical receiver 22 receives the multi-carrier optical signal transmitted from the optical transmitter 1 via the optical transmission line 21. The optical receiver 22 performs Fourier transformation on the received multi-carrier optical signal, and reproduces each of the sub-carrier modulated signals. Then, the optical receiver 22 demodulates each of the sub-carrier modulated signals and recovers the data signal.

The controller 15 allocates the sub-carriers 1-N to the lanes 1-M, as illustrated in FIG. 5. In this process, the controller 15 determines the number of sub-carriers to be allocated to each of the lanes 1-M in accordance with a bit rate of each of the lanes 1-M.

Note that frequencies of the sub-carriers 1-N are different from each other. For that reason, when a multi-carrier optical signal including the sub-carriers 1-N is transmitted, the quality of each of the sub-carriers 1-N is not equal in the optical receiver 22. Namely, an amount of information that can be transmitted by each of the sub-carriers 1-N is not constant. Specifically, a sub-carrier of good quality can transmit a large amount of information, but a sub-carrier of poor quality transmits a small amount of information.

Figure 6A:
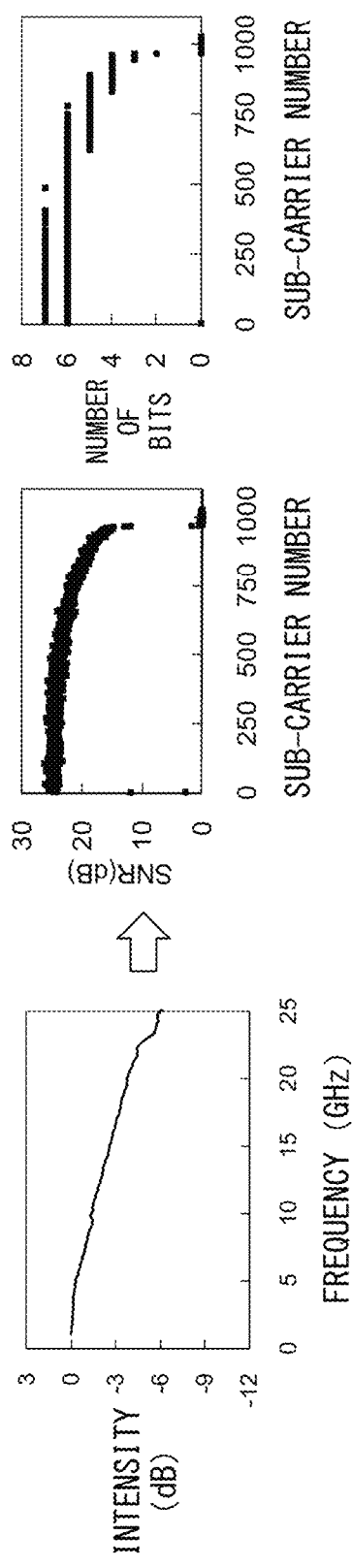
FIGS. 6A and 6B are diagrams explaining transmission characteristic and characteristic of a sub-carrier.

For example, as illustrated in FIG. 6A, the intensity of a received light in the optical receiver is affected by the band limitation. Here, an S/N ratio (SNR: Signal-to-Nose Ratio) of each sub-carrier depends on the intensity of the received light. Namely, when the intensity of the received light is reduced, the S/N ratio is also reduced. When the S/N ratio is reduced, the number of bits transmittable per symbol is reduced. For that reason, the number of bits transmittable per symbol of each of the sub-carriers is not constant. In the example illustrated in FIG. 6A, as a sub-carrier number is increased (namely, a frequency becomes higher), the number of bits transmittable per symbol is reduced. For example, each of the sub-carriers 1-500 can transmit 6 to 8 bits per symbol. On the other hand, each of the sub-carriers 800-900 can transmit only 2 to 4 bits per symbol.

Figure 6B:
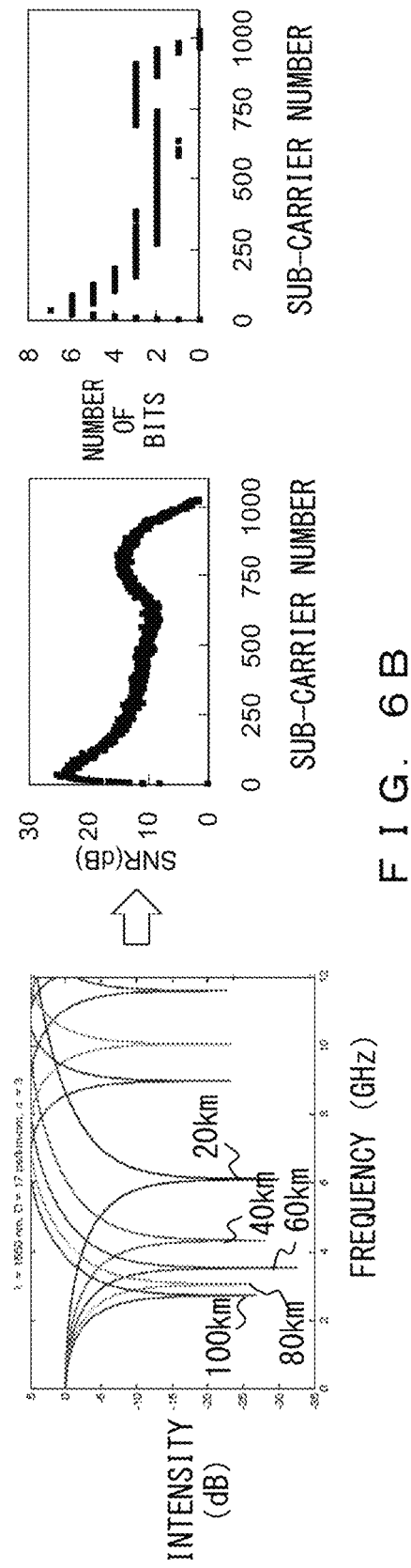

In addition, as illustrated in FIG. 6B, the intensity of the received light at the optical receiver is affected by a correlation between a chirp and a chromatic dispersion. FIG. 6B illustrates a result of a simulation performed under a condition in which wavelength is 1550 nm, chromatic dispersion is 17 ps/km/nm, chirp coefficient α is 3, and transmission distance is 20 km-100 km. When the chirp occurs, the intensity of the received light is periodically changed in accordance with a frequency. Accordingly, in the example illustrated in FIG. 6B, when a sub-carrier number (i.e., frequency) is increased, the number of bits transmittable per symbol becomes larger or smaller.

As described above, possible transmission capacities of the sub-carriers 1-N are not constant. Therefore, the optical transmitter 1 detects or calculates a possible transmission capacity of each of the sub-carriers 1-N in order to appropriately or effectively allocate sub-carriers to each of the lanes.

FIG. 7 is a diagram explaining a possible transmission capacity of a sub-carrier. A horizontal axis of a graph illustrated in FIG. 7 indicates a sub-carrier number. In this example, as illustrated in FIG. 5, the sub-carrier number corresponds to a frequency. Namely, the horizontal axis substantially indicates the frequency. A vertical axis of FIG. 7 indicates the number of bits transmittable per symbol as an example of a possible transmission capacity of each of the sub-carriers. Here, as the quality of the sub-carrier becomes higher, the number of bits that can be transmitted by one symbol becomes larger. Therefore, the vertical axis substantially corresponds to the quality of the sub-carrier.

As described above, an amount of information that can be transmitted by each of the sub-carriers (possible transmission capacity) is not constant. Therefore, the controller 15 allocates a sub-carrier to each lane according to the possible transmission capacity of each of the sub-carriers in addition to a bit rate of each of the lanes.

FIG. 8 is a flowchart illustrating an outline of a method for allocating a sub-carrier. The processes illustrated in this flowchart are performed by the controller 15. Assume that M lanes are connected to the optical transmitter 1, as illustrated in FIG. 4.

In S1, the controller 15 initializes a variable m to 1. The variable m identifies each lane. In S2, the controller 15 allocates a sub-carrier to a lane m. In S3, the controller 15 counts up the variable m by 1. In S4, the controller 15 compares the variable m with M. Here, M is the number of lanes connected to the optical transmitter 1. When the variable m is smaller than or equal to M, the process of the controller 15 returns to S2. On the other hand, when the variable m is larger than M, the process of the controller 15 is finished. As described above, the controller 15 selects each of the lanes one at a time in order, and allocates a sub-carrier to the respective selected lanes.

Figure 9:
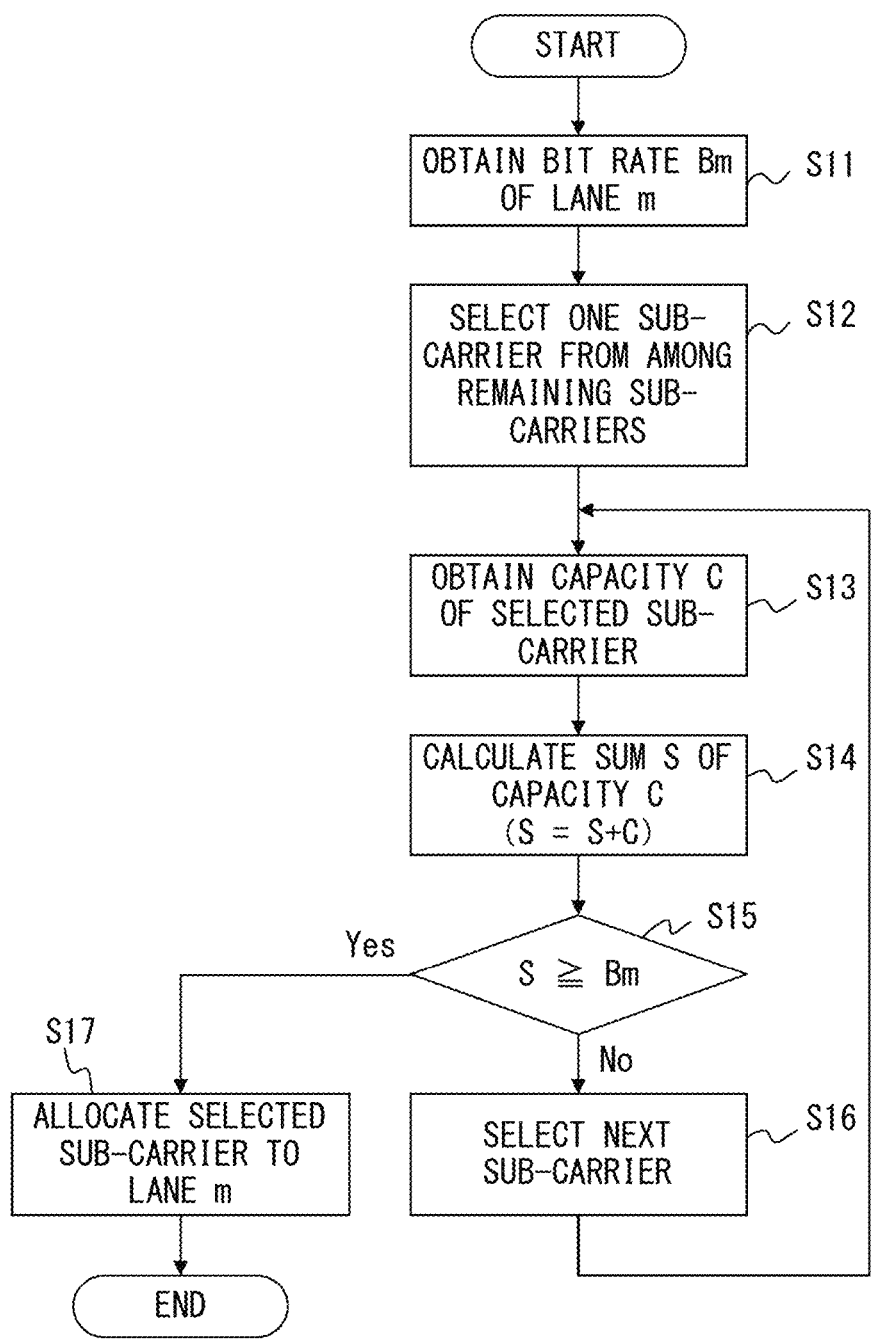
FIG. 9 is a flowchart illustrating an example of a method for allocating a sub-carrier to each lane.

FIG. 9 is a flowchart illustrating an example of a method for allocating a sub-carrier to each lane. The processes illustrated in the flowchart of FIG. 9 correspond to the process of S2 in FIG. 8. Namely, the processes in the flowchart of FIG. 9 are performed on each of the lanes. In the description below, a sub-carrier is allocated to a lane m (m=1-M).

In S11, the controller 15 obtains a bit rate (Bm) of the lane m. Assume that a bit rate of each of the lanes 1-M has been specified in advance although it is not particularly limited. In this case, information indicating the bit rate of each of the lanes 1-M is stored in a memory to which the controller 15 is accessible. Alternatively, the controller 15 may measure the bit rate of each of the lanes 1-M.

In S12, the controller 15 selects a sub-carrier with a smallest sub-carrier number from among remaining sub-carriers. "remaining sub-carrier" refers to a sub-carrier that has not been allocated to another lane.

In S13, the controller 15 obtains a capacity C of the selected sub-carrier. The capacity C is not particularly limited, but refers to, for example, a largest bit rate that a sub-carrier can transmit. In addition, assume for example that a capacity of each of the sub-carriers has been measured in advance, although it is not particularly limited. In this case, information indicating the capacity of each of the sub-carriers is stored in a memory to which the controller 15 is accessible. Alternatively, the capacity of each of the sub-carriers may be designated in advance according to a parameter relating to the transmission from the optical transmitter 1 to the optical receiver 2, or the like. Note that the capacity C corresponds to the number of bits transmittable per symbol.

In S14, the controller 15 calculates a sum S of the capacity C for the selected sub-carrier. Namely, when a plurality of sub-carriers are selected by repeatedly performing the processes of S13-S16, the sum S of the respective capacities C for the plurality of selected sub-carriers is calculated. The sum S may be calculated by cumulatively adding the capacity C of the selected sub-carrier.

In S15, the controller 15 compares the bit rate Bm of the lane m with the sum S of the capacity of the selected sub-carrier. When the sum S of the capacity C of the selected sub-carrier is less than the bit rate Bm, the controller 15 selects a next sub-carrier in S16. In this case, the controller 15 selects a sub-carrier with a smallest sub carrier number from among remaining sub-carriers. Then, the process of the controller 15 returns to S13. Namely, the processes of S13-S16 are repeatedly performed until the sum S of the capacity becomes larger than or equal to the bit rate Bm.

When the sum S of the capacity C of the selected sub-carrier is larger than or equal to the bit rate Bm of the lane m (S15: Yes), the process of the controller 15 proceeds to S17. In S17, the controller 15 allocates one or a plurality of sub-carriers selected in S13-S16 to the lane m. Then, the controller 15 generates allocation information indicating the allocation of a sub-carrier to the lane m.

As described above, in the example illustrated in FIG. 9, a sub-carrier with a smaller sub carrier number is allocated one at a time in order to the lanes 1-M. As a result, the sub-carriers 1-N are allocated to the lanes 1, 2, 3, ..., as illustrated in FIG. 7. Here, in the example illustrated in FIG. 7, assume that bit rates of the lanes 1-M are the same as each other. In this case, in a frequency range in which many sub-carriers with a satisfactory quality exist, the number of sub-carriers allocated to one lane is small. For example, the numbers of sub-carriers respectively allocated to the lanes 1-3 are small. On the contrary, in a frequency range in which many sub-carriers with a poor quality exist, the number of sub-carriers allocated to one lane is large. For example, the numbers of sub-carriers respectively allocated to the lanes 4 and 5 are large.

As described above, the controller 15 respectively allocates a sub-carrier to all of the lanes, as illustrated in FIG. 8. Then, the controller 15 generates the allocation information indicating the allocation of the sub-carrier to each of the lanes 1-M. The allocation information generated by the controller 15 is given to the digital signal processor 11.

In the example illustrated in FIG. 9, a sub-carrier with a smaller sub-carrier number is allocated one at a time in order to each of the lanes 1-M, but the operation of the optical transmitter 1 according to the embodiments is not limited to this. For example, the controller 15 may allocate a sub-carrier with a larger sub-carrier number in order to each of the lanes 1-M. Alternatively, a plurality of sub-carriers allocated to each lane do not need to be consecutive.

In one embodiment, the controller 15 is configured to include a processor and a memory. In this case, the controller 15 allocates a sub-carrier to each lane by executing a given program. In addition, the controller 15 may include a hardware circuit.

An example of the allocation of the sub-carrier is described below. In the description below, assume that a bit rate of a lane 1 is 10 Gbps. In addition, assume that a capacity of each sub-carrier is as described below. Here, assume that a margin is zero, in order to simplify the description.

Sub-carriers 1-20: 120 Mbps
Sub-carriers 21-60: 100 Mbps
Sub-carriers 61-200: 80 Mbps In this case, a sum of capacities of the sub-carriers 1-20 is 2.4 Gbps (120 Mbps×20). A sum of capacities of the sub-carriers 21-60 is 4.0 Gbps (100 Mbps×40). Thus, in order to obtain 3.6 Gbps (80 Mbps×45) using the sub-carriers 61-200, 45 sub-carriers within the sub-carriers 61-200 need to be selected. In this case, the sub-carriers 61-105 are selected from among the sub-carriers 61-200. As described above, in order to provide a bit rate of 10 Gbps, the sub-carriers 1-20, 21-60, and 61-105 are selected. Therefore, in this case, the controller 15 allocates the sub-carriers 1-20, 21-60, and 61-105 to the lane 1. Further, the controller 15 allocates sub-carriers to each of the lanes 2-M in a similar manner.

As described above, the controller 15 allocates sub-carriers to each lane. Then, the controller 15 generates the allocation information indicating the allocation of the sub-carriers to each lane. Here, in this embodiment, the allocation information includes information indicating a possible transmission capacity of each sub-carrier.

FIG. 10 illustrates an example of the allocation information. In the example illustrated in FIG. 10, sub-carriers 1-79 are allocated to the lane 1, and sub-carriers 80-175 are allocated to the lane 2. Similarly, a plurality of sub-carriers are respectively allocated to another lane. A method for allocating sub-carriers to each lane is as described above with reference to FIG. 8 and FIG. 9.

The allocation information further includes information indicating a possible transmission capacity for each sub-carrier allocated to a corresponding lane. The possible transmission capacity is expressed by the number of bits transmittable per symbol. In the example illustrated in FIG. 10, the possible transmission capacities of the sub-carriers 1 and 2 are "6 bits/symbol", and the possible transmission capacities of the sub-carriers 3-79 are "5 bits/symbol".

The allocation information may further include information indicating a modulation scheme for each sub-carrier allocated to a corresponding lane. In the example illustrated in FIG. 10, the modulation scheme of the sub-carriers 1 and 2 is "64QAM", and the modulation scheme of the sub-carriers 3-79 is "32QAM". Here, the number of bits transmittable per symbol and the modulation scheme uniquely correspond to each other. Therefore, the allocation information may be configured so as to include either one of the "possible transmission capacity" and the "modulation scheme" illustrated in FIG. 10.

The controller 15 gives the allocation information to the digital signal processor 11. By so doing, the digital signal processor 11 generates a multi-carrier signal that transmits a plurality of data signals received via the lanes 1-M in accordance with the allocation information.

Figure 11:
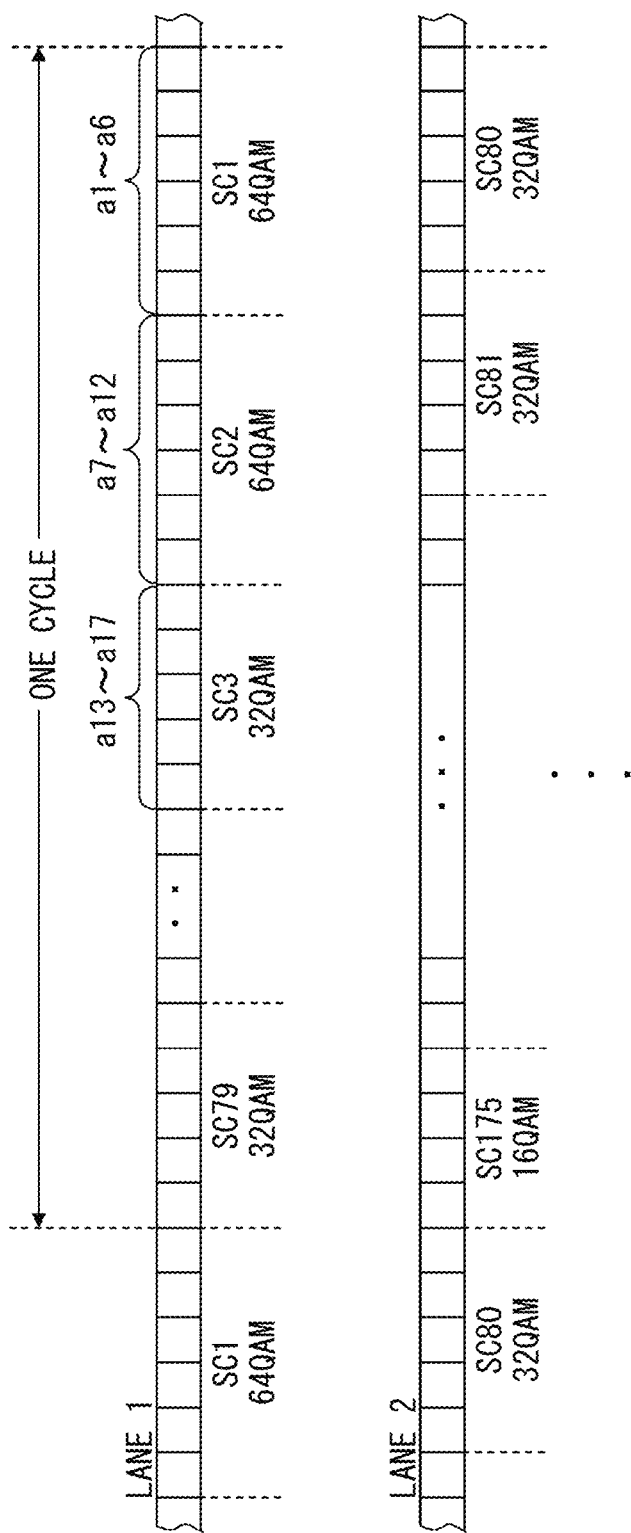
FIG. 11 is a diagram explaining an operation of a modulator.

FIG. 11 is a diagram explaining an operation of a modulator. Here, assume that the allocation information illustrated in FIG. 10 is given from the controller 15 to the digital signal processor 11. "SC" illustrated in FIG. 11 refers to as a sub-carrier.

A data signal of the lane 1 is input to the modulator 12-1. The modulator 12-1 extracts a bit string to be transmitted using the sub-carrier 1, from the input data signal. Here, "possible transmission capacity=6 bits" has been determined for the sub-carrier 1. Therefore, the modulator 12-1 extracts 6 bits (a1-a6) from the input data signal. Then, the modulator 12-1 modulates the sub-carrier 1 with 64QAM. In this operation, a phase and an amplitude of the sub-carrier 1 are determined in accordance with values of the bits a1-a6. As a result, a modulated signal for the sub-carrier 1 is generated.

Next, the modulator 12-1 extracts a bit string to be transmitted using the sub-carrier 2, from the input data signal. Here, "possible transmission capacity=6 bits" has been determined for the sub-carrier 2. Therefore, the modulator 12-1 extracts the subsequent 6 bits (a7-a12) from the input data signal. Then, the modulator 12-1 modulates the sub-carrier 2 with 64QAM. In this operation, a phase and amplitude of the sub-carrier 2 are determined in accordance with values of the bits a7-a12. As a result, a modulated signal for the sub-carrier 2 is generated.

Further, the modulator 12-1 extracts a bit string to be transmitted using the sub-carrier 3, from the input data signal. Here, "possible transmission capacity=5 bits" has been determined for the sub-carrier 3. Therefore, the modulator 12-1 extracts the subsequent 5 bits (a13-a17) from the input data signal. Then, the modulator 12-1 modulates the sub-carrier 3 with 32QAM. In this operation, a phase and amplitude of the sub-carrier 3 are determined in accordance with values of the bits a13-a17. As a result, a modulated signal for the sub-carrier 3 is generated.

Similarly, the modulator 12-1 respectively generates modulated signals for the sub-carriers 4-79. As described above, the modulator 12-1 generates 79 sub-carrier modulated signals when the allocation information illustrated in FIG. 10 is provided.

Other modulators similarly generate a plurality of sub-carrier modulation signals from corresponding data signals. In FIG. 11, a plurality of sub-carrier modulated signals are generated from a data signal of the lane 2.

Here, the number of sub-carriers allocated to each lane is determined according to a possible transmission capacity of each sub-carrier allocated to a corresponding lane in addition to a bit rate of each lane. Accordingly, even when bit rates of the lanes 1-M are the same as each other, the numbers of the sub-carriers allocated to the lanes may be different from each other.

A plurality of sub-carrier modulated signals generated by each of the modulators 12-1 to 12-M are fed to a corresponding one of the inverse Fourier transformers 13-1 to 13-M. For example, in the examples illustrated in FIG. 10 and FIG. 11, modulated signals of the sub-carriers 1-79 generated by the modulator 12-1 are fed to the inverse Fourier transformer 13-1.

Each of the inverse Fourier transformers 13-1 to 13-M performs inverse Fourier transformation on a plurality of input sub-carrier modulated signals and generates a time domain signal. Here, each of the inverse Fourier transformers 13-1 to 13-M may include a serializer that converts a calculation result of the inverse Fourier transformation into serial data.

The processes of the modulators 12-1 to 12-M may be performed sequentially or in parallel to each other. In addition, the processes of the inverse Fourier transformers 13-1 to 13-M may be performed sequentially or in parallel to each other.

The combiner 14 combines the plurality of time domain signals generated by the inverse Fourier transformers 13-1 to 13-M and generates a multi-carrier signal. As described above, the digital signal processor 11 converts a plurality of data signals into a multi-carrier signal in accordance with the allocation information generated by the controller 15. The multi-carrier signal is converted into an optical signal and is output to the optical transmission line.

Figure 1:
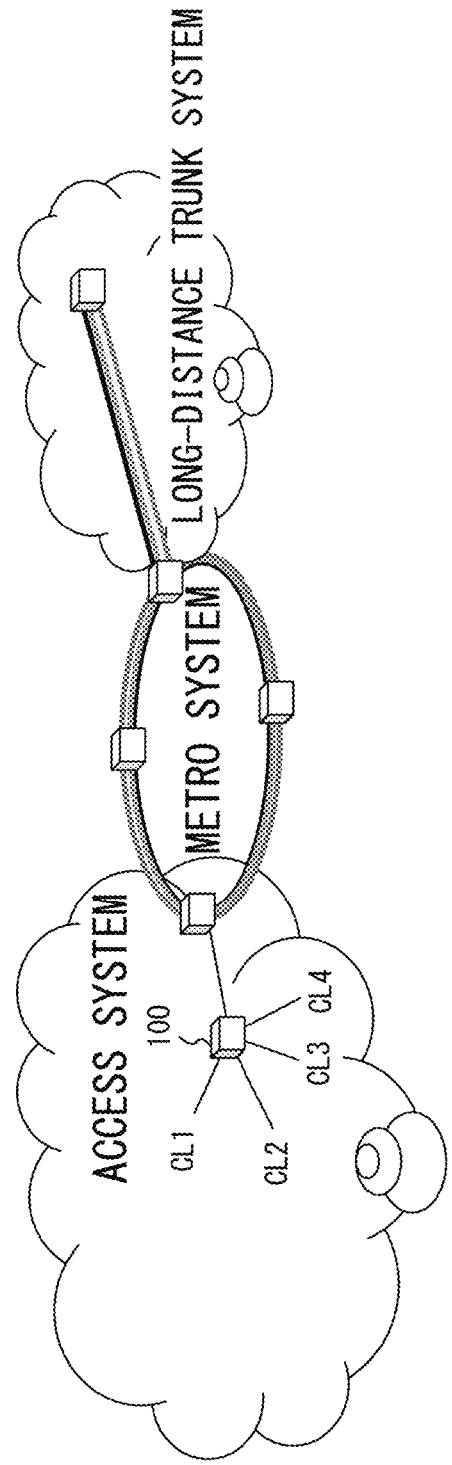
FIG. 1 illustrates an example of an optical network.
Figure 2:
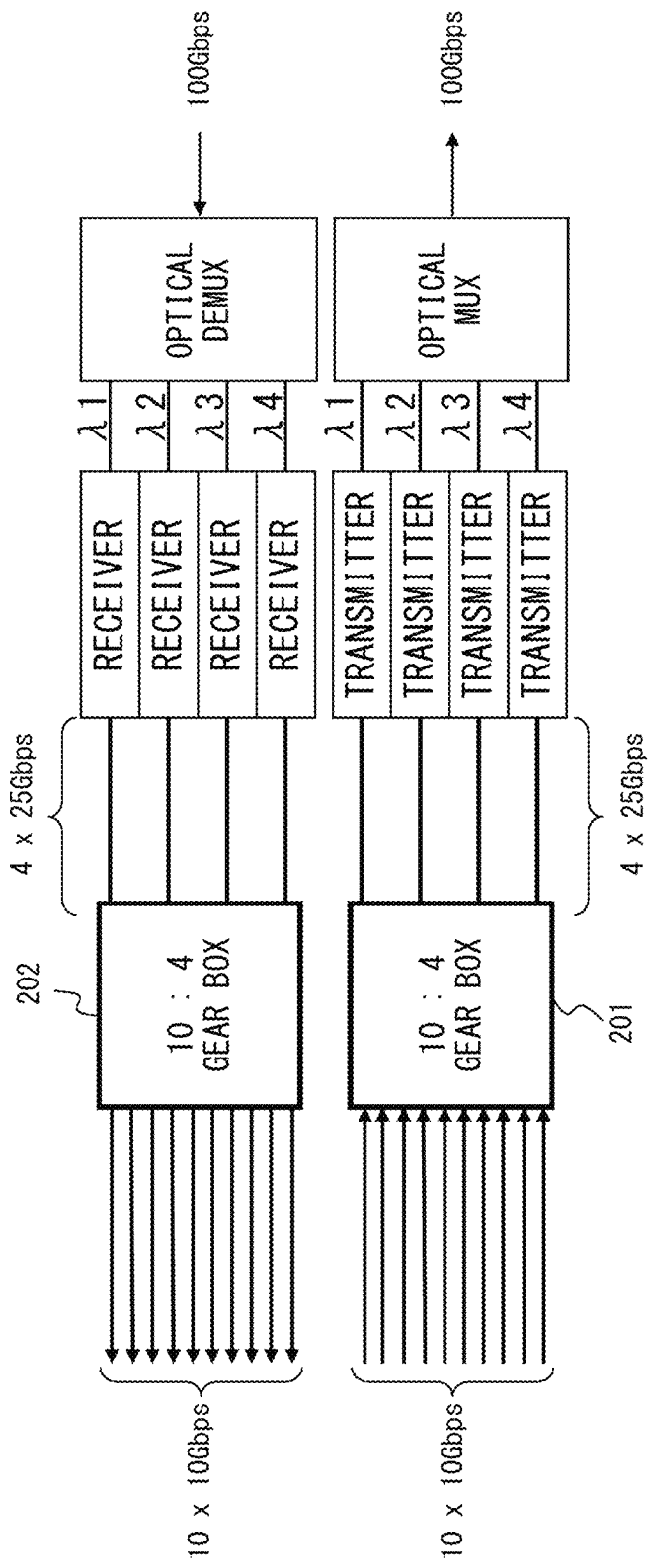
FIG. 2 illustrates an example of a conventional optical transceiver.
Figure 3:
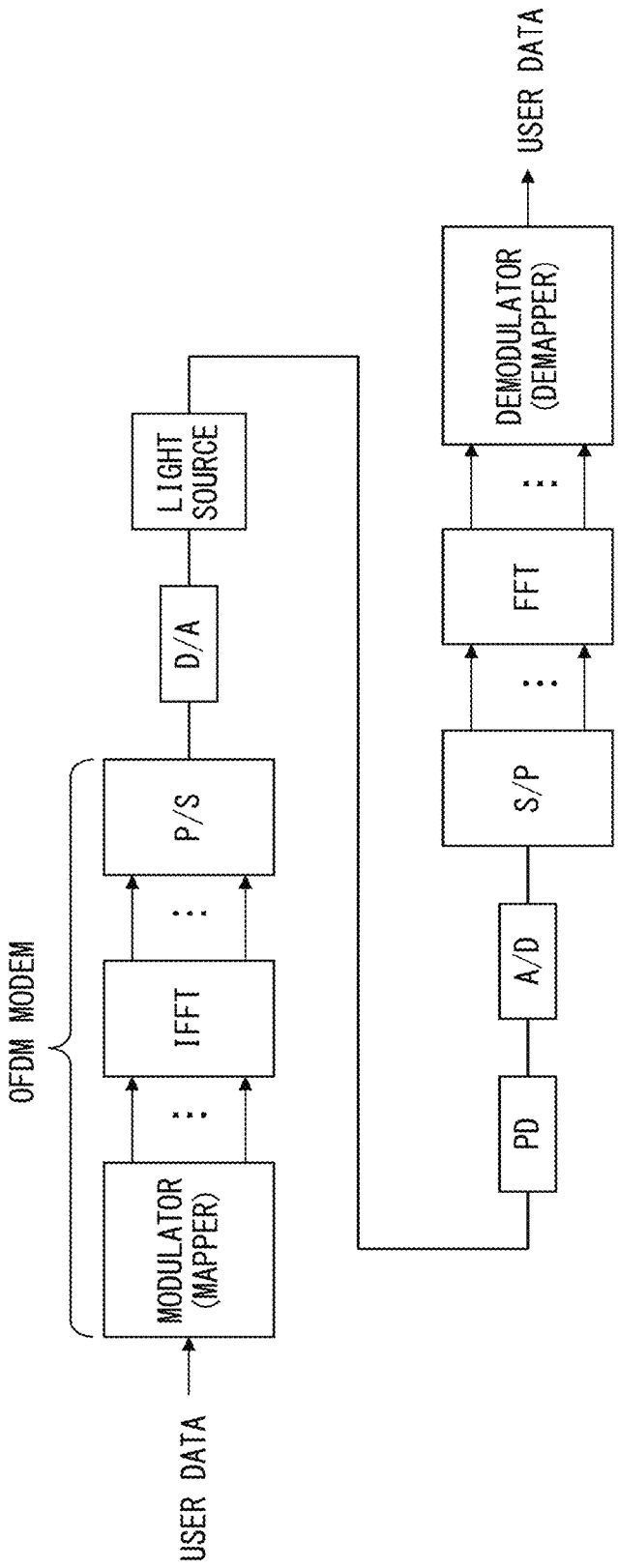
FIG. 3 illustrates an example of a configuration of an optical transmission system that uses an OFDM base intensity modulation system.

As described above, in the optical transmitter 1 according to the embodiments, a data signal received via each lane is converted into a multi-carrier signal without being multiplexed in an electric domain. Namely, the optical transmitter 1 according to the embodiments can multiplex signals transmitted via a plurality of lanes and output the multiplexed signal to one lane without providing the gear box illustrated in FIG. 2. Therefore, according to the configuration of the embodiments, consumption power and/or a circuit size of an optical transmitter is reduced compared with a configuration of a conventional technique.

In addition, in the optical transmitter 1 according to the embodiments, the number of sub-carriers allocated to each lane is determined according to a possible transmission capacity of each sub-carrier allocated to a corresponding lane, in addition to a bit rate of each lane. Therefore, it is possible to transmit data using the sub-carrier effectively.

First Embodiment

Figure 12:
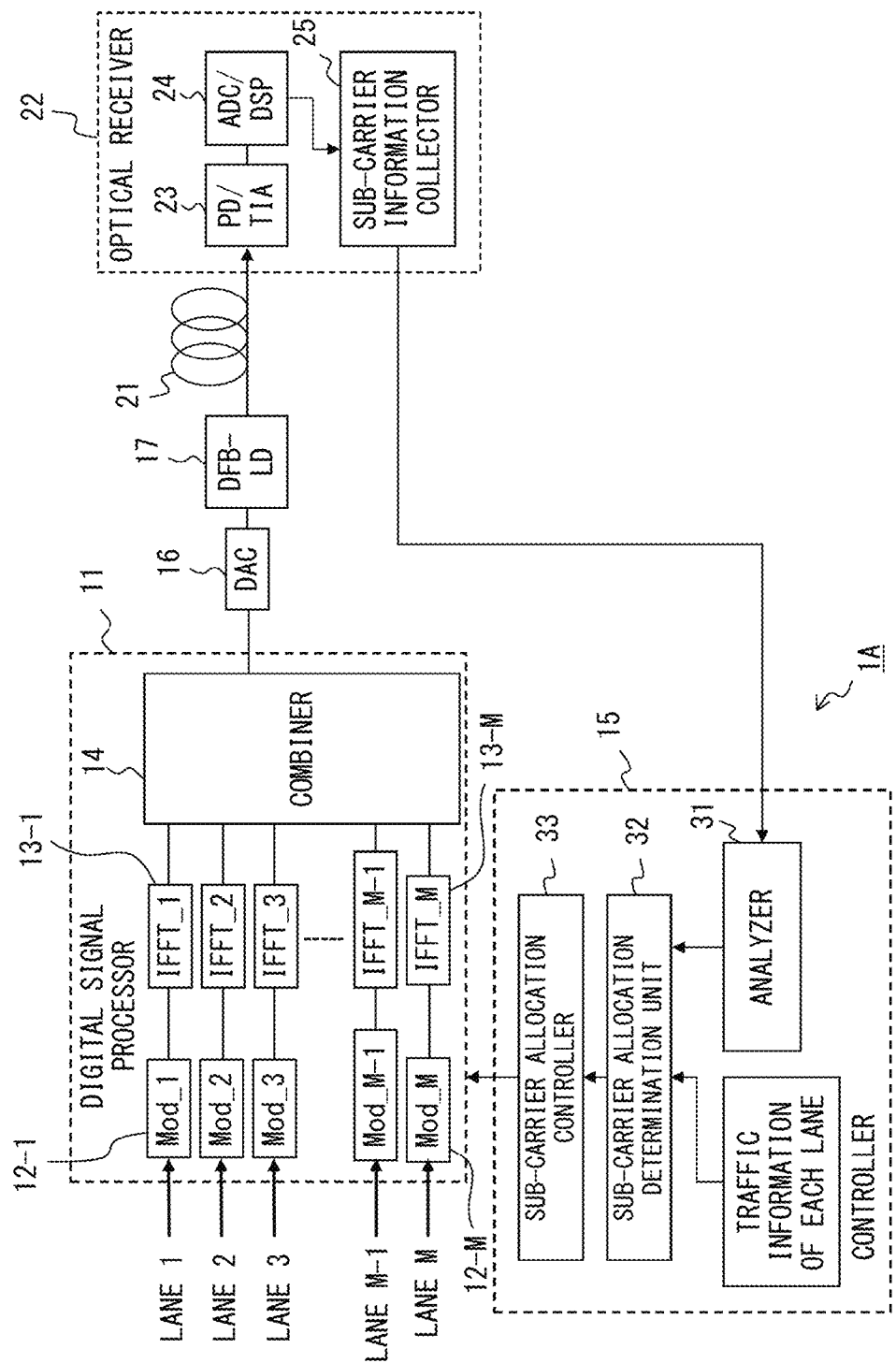
FIG. 12 illustrates a configuration of an optical transmitter according to a first embodiment.

FIG. 12 illustrates a configuration of an optical transmitter 1A according to the first embodiment. The optical transmitter 1A according to the first embodiment includes a digital signal processor 11, a controller 15, a D/A converter 16, and a light source (DFB-LD) 17. The descriptions of the configurations and operations of the digital signal processor 11, the D/A converter 16, and the light source 17 are omitted.

The optical transmitter 1A according to the first embodiment allocates sub-carriers by using quality information detected in the optical receiver 22. Therefore, the optical receiver 22 is simply described first. The optical receiver 22 receives a multi-carrier signal generated by the optical transmitter 1A via the optical transmission line 21.

The optical receiver 22 includes a front-end circuit 23, a signal processor 24, and a sub-carrier information collector 25. The front-end circuit 23 includes a photo detector (PD) and an amplifier (TIA: Transimpedance Amplifier). The photo detector converts a received optical signal into an electric signal. The amplifier amplifies the electric signal obtained by the photo detector. Therefore, a multi-carrier signal is reproduced by the front-end circuit 23. The signal processor 24 includes an A/D converter (ADC: Analog-to-Digital Converter) and a digital signal processor (DSP). The A/D converter converts the received multi-carrier signal into a digital signal. The digital signal processor performs Fourier transformation on the multi-carrier signal so as to generate frequency domain signals. Namely, each of the sub-carrier signals is reproduced by the digital signal processor.

The sub-carrier information collector 25 detects a quality of each of the sub-carriers. The quality is expressed by, for example, a S/N ratio (SNR: Signal-to-Nose Ratio). In this case, the sub-carrier information collector 25 detects an S/N ratio of each of the sub-carriers. The S/N ratio can be detected using a publicly known technique. The sub-carrier information collector 25 may detect another quality parameter. For example, when a data signal of each of the sub-carriers is recovered by the signal processor 24, the sub-carrier information collector 25 may detect a bit error rate, or the like, for each of the sub-carriers.

The S/N ratio may be measured, for example, before an actual data transmission. In this case, the modulation schemes of the sub-carriers 1-N may be the same as each other, although it is not particularly limited. In addition, data signals transmitted by the sub-carriers 1-N may be the same as each other.

As described above, the optical receiver 22 detects the quality of each of the sub-carriers. Then, the optical receiver 22 transmits quality information that indicates the quality of each of the sub-carriers to the optical transmitter 1A. In the optical transmitter 1A, the quality information that indicates the quality of each of the sub-carriers is given to the controller 15.

The controller 15 includes an analyzer 31, a sub-carrier allocation determination unit 32, and a sub-carrier allocation controller 33. The analyzer 31 calculates a possible transmission capacity of each of the sub-carriers according to the quality of each of the sub-carriers detected in the optical receiver 22. The possible transmission capacity may be calculated in bit rate (bps). Alternatively, the possible transmission capacity may be calculated in the number of bits transmittable per symbol. Note that FIG. 7 illustrates an example of the possible transmission capacity of each of the sub-carriers calculated by the analyzer 31.

The sub-carrier allocation determination unit 32 determines the allocation of sub-carriers to each lane according to traffic information of each lane and the possible transmission capacity of each of the sub-carriers. In this example, the traffic information of each lane is stored in a memory included in the controller 15 (or, a memory to which the controller 15 can access). The traffic information of each lane is, for example, a bit rate of a data signal of each lane. The traffic information of each lane is reported from a network management system not illustrated to the optical transmitter 1. The possible transmission capacity of each of the sub-carriers is calculated by the analyzer 31, as described above.

The sub-carrier allocation controller 33 generates allocation information indicating the allocation of sub-carriers to each lane in accordance with the allocation determined by the sub-carrier allocation determination unit 32. The sub-carrier allocation controller 33 may include information indicating the possible transmission capacity of each of the sub-carriers in the allocation information by using a calculation result by the analyzer 31. Then, the sub-carrier allocation controller 33 gives the generated allocation information to the digital signal processor 11. By so doing, the digital signal processor 11 converts a plurality of data signals into a multi-carrier signal in accordance with the allocation information. Note that FIG. 10 illustrates an example of the allocation information generated by the sub-carrier allocation controller 33.

As described above, in the first embodiment, the quality of each of the sub-carriers is detected in the optical receiver 22. The optical transmitter 1A generates a multi-carrier signal according to the detected quality of each of the sub-carriers in addition to a bit rate of each lane.

Second Embodiment

Figure 13:
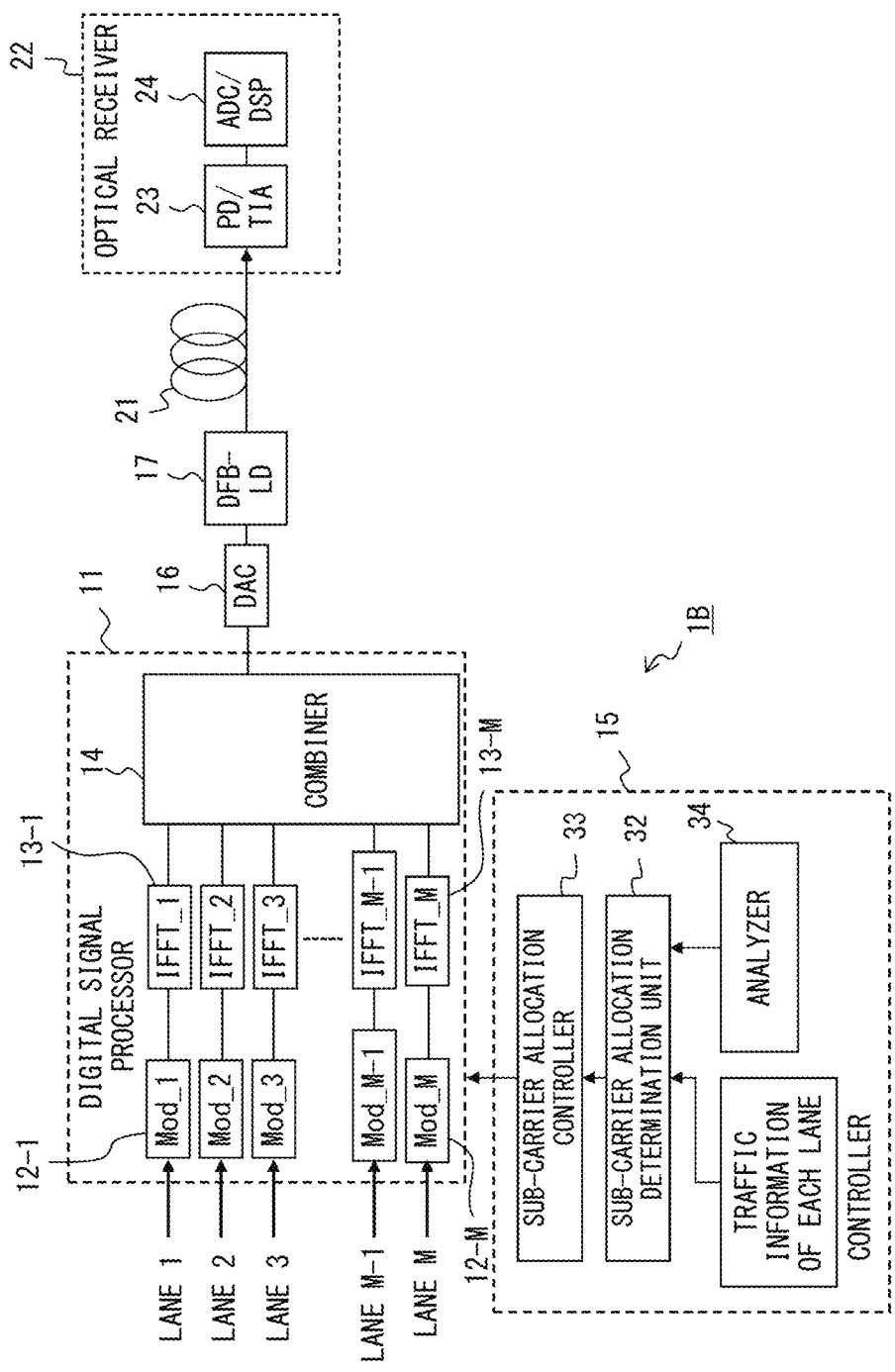
FIG. 13 illustrates a configuration of an optical transmitter according to a second embodiment.

FIG. 13 illustrates a configuration of an optical transmitter 1B according to the second embodiment. The optical transmitter 1B according to the second embodiment includes a digital signal processor 11, a controller 15, a D/A converter 16, and a light source (DFB-LD) 17. The descriptions of the configurations and operations of the digital signal processor 11, the D/A converter 16, and the light source 17 are omitted.

The controller 15 includes an analyzer 34, a sub-carrier allocation determination unit 32, and a sub-carrier allocation controller 33. The analyzer 34 calculates a possible transmission capacity of each sub-carrier according to information relating to the transmission between the optical transmitter 1B and the optical receiver 2 (hereinafter referred to as transmission system information). The transmission system information is not particularly limited, but includes, for example, one or more of the following parameters.
(1) Wavelength of signal light
(2) Type or performance of a modulator
(3) Type or characteristic of an optical fiber
(4) Transmission distance
(5) Loss and chromatic dispersion of an optical transmission line
(6) Number of optical amplifiers on an optical transmission line
(7) Received power in an optical receiver
(8) S/N ratio and a cumulative chromatic dispersion detected in an optical receiver A portion of the transmission system information is given from a system administrator to the optical transmitter 1B. For example, the system administrator may provide aforementioned (1)-(6) in the optical transmitter 1B. In addition, another portion of the transmission system information is collected by measurement. For example, aforementioned (7)-(8) may be measured in the optical receiver 22.

The analyzer 34 calculates the possible transmission capacity of each sub-carrier according to the given transmission system information. The analyzer 34 can calculate the possible transmission capacity of each sub-carrier from the transmission system information using a specified calculation formula. In addition, the analyzer 34 may refer to a lookup table storing a correspondence relation between the transmission system information and the possible transmission capacity of each sub-carrier, and obtain the possible transmission capacity of each sub-carrier. In this case, the correspondence relation between the transmission system information and the possible transmission capacity of each sub-carrier is generated by, for example, a system administrator, and is stored in the lookup table.

FIG. 14 illustrates an example of the lookup table. In this embodiment, a correspondence relation between a combination of a transmission distance and a wavelength band, and the possible transmission capacity of each sub-carrier is stored in the lookup table. The transmission distance corresponds to a length of the optical transmission line between the optical transmitter 1B and the optical receiver 22 in an example illustrated in FIG. 13. The wavelength band represents a wavelength band to which the sub-carriers 1-N belong (e.g., C band/L band). The chromatic dispersion is 1 ps/nm in the 1310 nm band, and is 17 ps/nm in the 1550 nm band.

The possible transmission capacity of each sub-carrier is expressed by the number of bits transmittable per symbol. However, the possible transmission capacity may be expressed in another format (e.g., a bit rate (bps)). "SC-No." refers to as a sub-carrier number.

When the transmission distance and the wavelength band are given as the transmission system information, the analyzer 34 refers to the lookup table illustrated in FIG. 14 so as to obtain the possible transmission capacity (the number of bits) of each sub-carrier. For example, when "transmission distance=10 km" and "wavelength band=1550 nm" are given, the analyzer 34 obtains the possible transmission capacity described below for each of the sub-carriers.
Sub carrier 1: 6 bits Sub carrier 2: 6 bits
Sub carrier 3: 5 bits
Sub carrier 1023: 3 bits
Sub carrier 1024: 2 bits As described above, the analyzer 34 obtains the possible transmission capacity for each of the sub-carriers from the calculation or the lookup table. Then, the sub-carrier allocation determination unit 32 determines the allocation of sub-carriers to each lane according to the traffic information of each lane and the possible transmission capacity of each of the sub-carriers. In addition, the sub-carrier allocation controller 33 generates the allocation information indicating the allocation of sub-carriers to each lane. The operations of the sub-carrier allocation determination unit 32 and the sub-carrier allocation controller 33 are substantially the same as those in the first embodiment. Therefore, in the second embodiment, similarly to the first embodiment, a plurality of sub-carriers are appropriately or effectively allocated respectively to a plurality of lanes.

Third Embodiment

Figure 15:
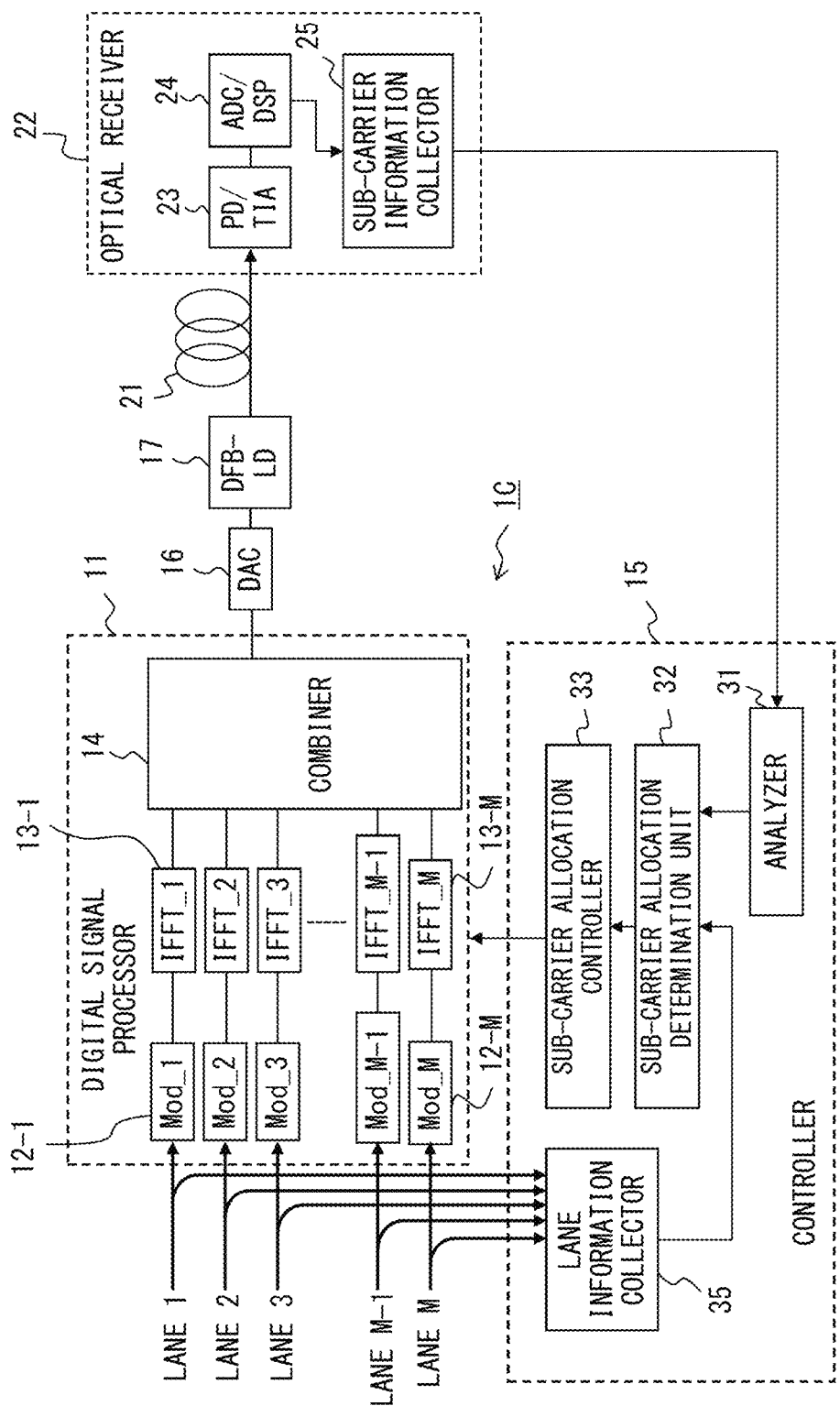
FIG. 15 illustrates a configuration of an optical transmitter according to a third embodiment.

FIG. 15 illustrates a configuration of an optical transmitter 1C according to the third embodiment. The controller 15 of the optical transmitter 1C according to the third embodiment includes an analyzer 31, a sub-carrier allocation determination unit 32, a sub-carrier allocation controller 33, and a lane information collector 35. The operations of the analyzer 31, the sub-carrier allocation determination unit 32, and the sub-carrier allocation controller 33 are substantially the same as those in the first embodiment, and therefore the descriptions thereof are omitted.

The lane information collector 35 detects a bit rate of a data signal of each lane. The data signal of each of the lanes 1-M is guided to the digital signal processor 11, and is also guided to the lane information collector 35. Then, the lane information collector 35 detects respective bit rates of the data signals of the lanes 1-M. The bit rate of the data signal is not particularly limited, but can be detected with a publicly known technique.

As described above, unlike the first embodiment, the controller 15 according to the third embodiment detects a bit rate of each lane by measurement. However, the operations of the sub-carrier allocation determination unit 32 and the sub-carrier allocation controller 33 are substantially the same as those in the first embodiment. Therefore, in the third embodiment, similarly to the first embodiment, a plurality of sub-carriers are appropriately or effectively allocated respectively to a plurality of lanes.

In the example illustrated in FIG. 15, a function of detecting a bit rate of each lane is provided for a configuration in the first embodiment as a base, but the present invention is not limited to this configuration. Namely, a function of detecting a bit rate of each lane may be provided for a configuration in the second embodiment.

Fourth Through Sixth Embodiments

Figure 16:
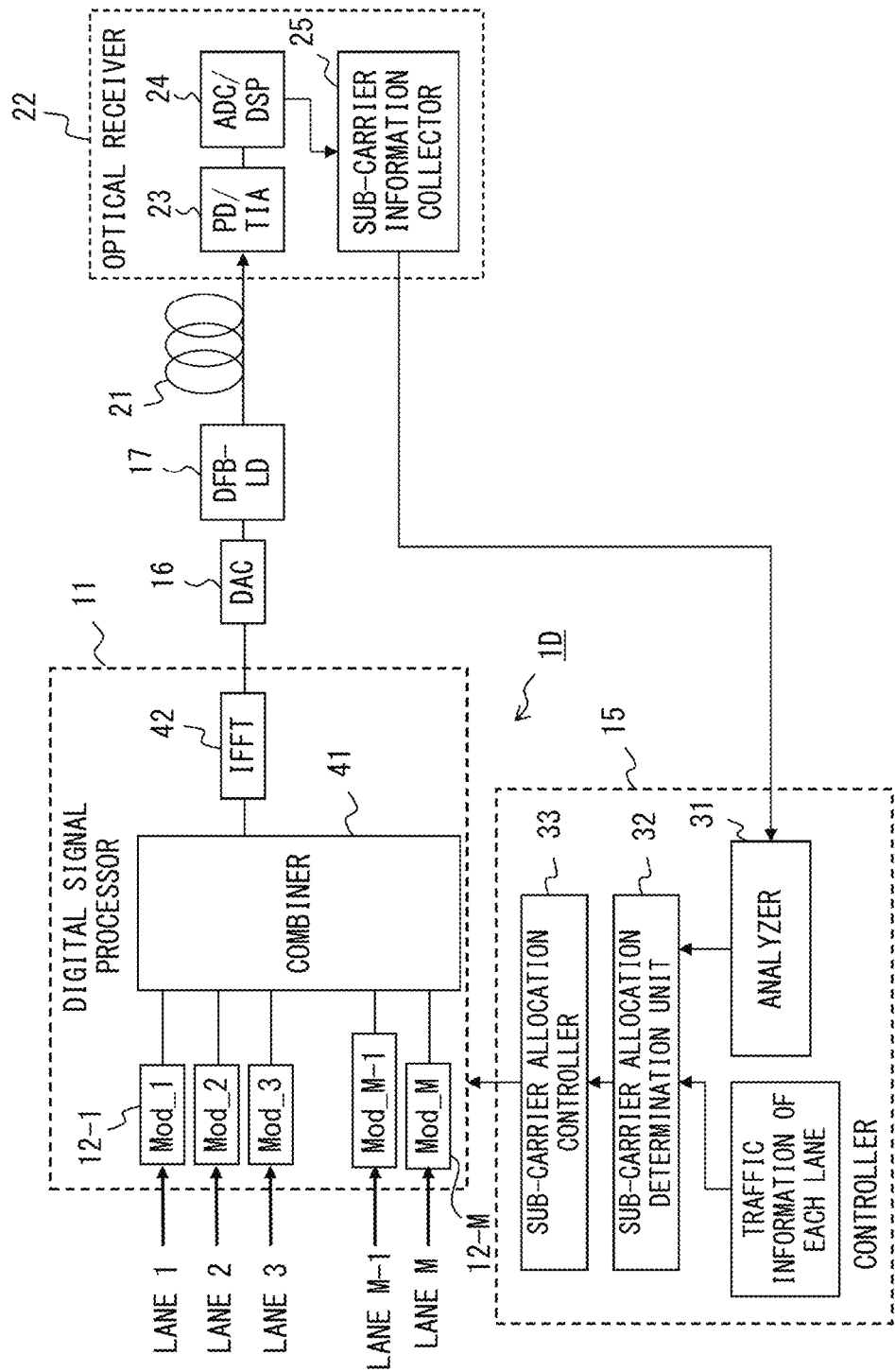
FIG. 16 illustrates a configuration of an optical transmitter according to a fourth embodiment.
Figure 17:
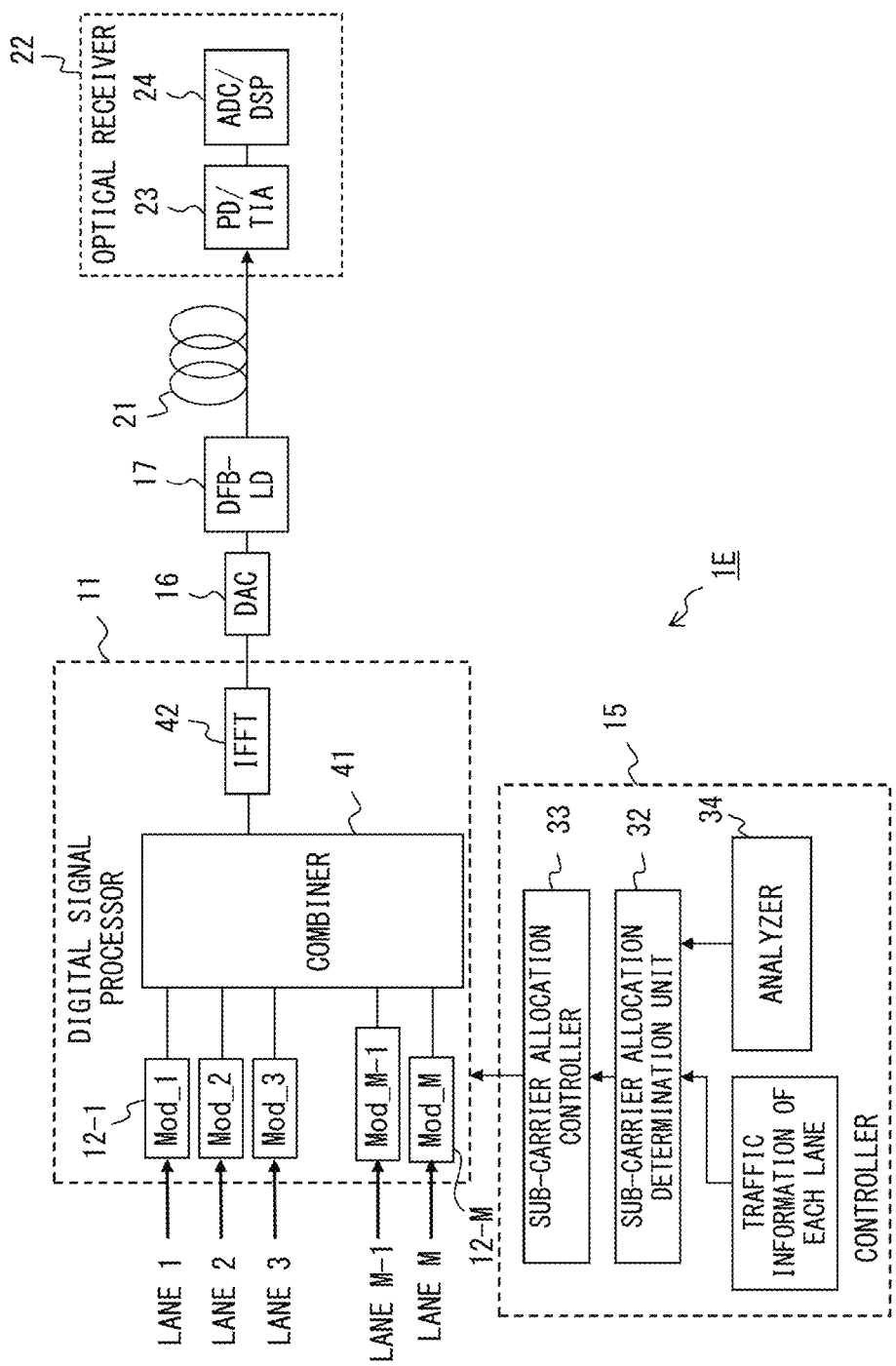
FIG. 17 illustrates a configuration of an optical transmitter according to a fifth embodiment.
Figure 18:
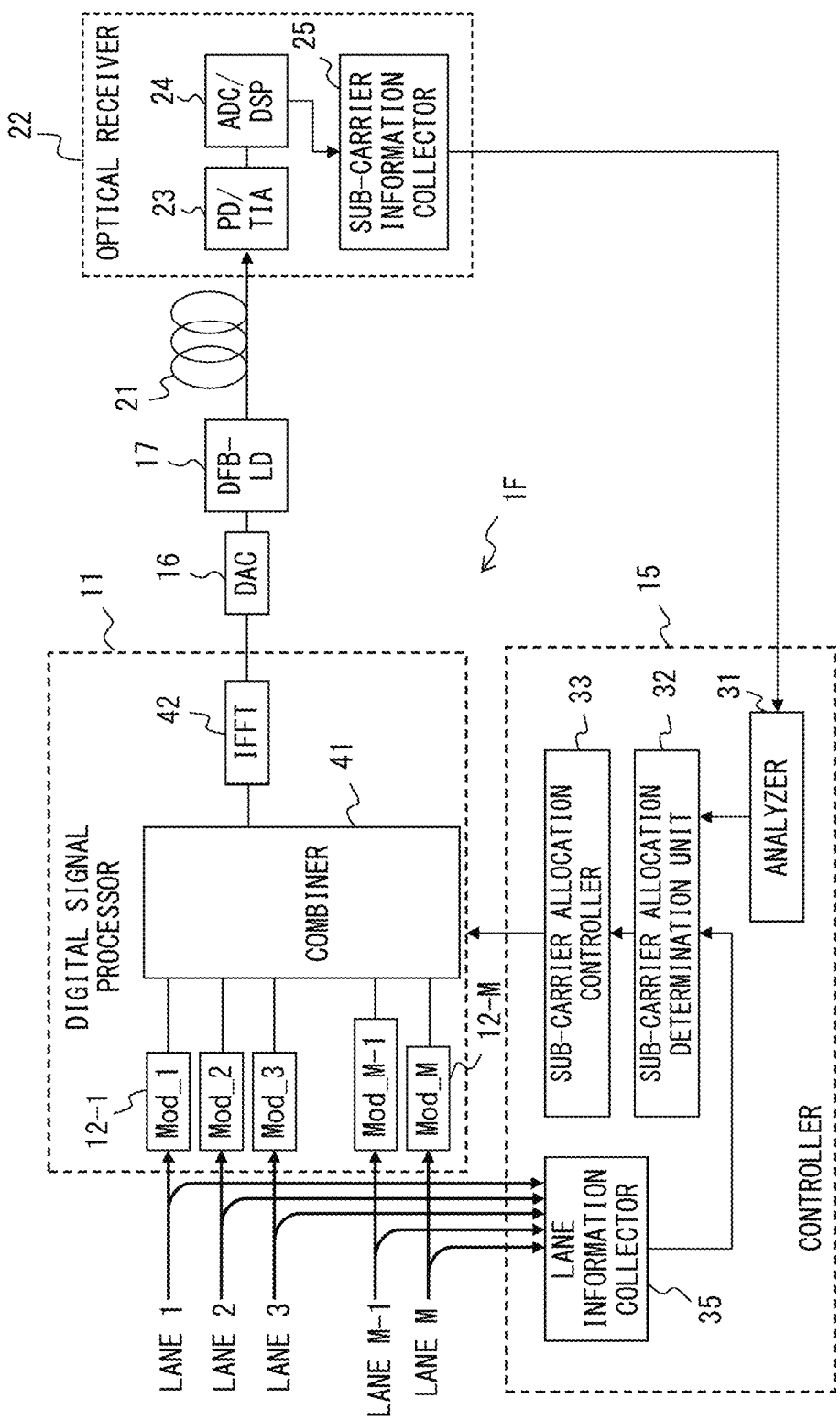
FIG. 18 illustrates a configuration of an optical transmitter according to a sixth embodiment.

FIG. 16, FIG. 17, and FIG. 18 respectively illustrate an optical transmitter 1D according to the fourth embodiment, an optical transmitter 1E according to the fifth embodiment, and an optical transmitter 1F according to the sixth embodiment. The fourth through sixth embodiments respectively correspond to the first through third embodiments. The first through third embodiments are different from the fourth through sixth embodiments in the configuration and operation of a digital signal processor 11. In the first through third embodiments, the digital signal processor 11 includes the plurality of modulators 12-1 to 12-M, the plurality of inverse Fourier transformers 13-1 to 13-M, and the combiner 14. On the other hand, the digital signal processor 11 according to the fourth through sixth embodiments includes modulators 12-1 to 12-M, a combiner 41, and an inverse Fourier transformer 42.

Similarly to the first through third embodiments, the modulators 12-1 to 12-M respectively generate sub-carrier modulated signals from data signals of corresponding lanes in accordance with allocation information given from the controller 15. The combiner 41 combines the plurality of sub-carrier modulated signals generated by the modulators 12-1 to 12-M. Here, the combiner 41 may output a plurality of signals in parallel. In this case, the combiner 41 may output in parallel signals of the number determined according to a size of the inverse Fourier transformer 42. Then, the inverse Fourier transformer 42 generates a multi-carrier signal by performing inverse Fourier transformation on the output signals from the combiner 41.

As described above, the first through third embodiments are different from the fourth through sixth embodiments in the procedure of the processing performed by the digital signal processor 11, but the processing contents are substantially the same. Therefore, also in the fourth through sixth embodiments, similarly to the first embodiment, a plurality of sub-carriers are appropriately or effectively allocated respectively to a plurality of lanes.

Seventh Embodiment

In optical communication, a transmission quality sometimes deteriorates due to chirp. Chirp is a phenomenon in which an optical wavelength fluctuates, and mat be caused by various factors.

FIG. 19 illustrates a possible transmission capacity of each sub-carrier with respect to a chirp coefficient $\alpha$. In an example illustrated in FIG. 19, in all cases, a possible transmission capacity of a sub-carrier on a low frequency side (e.g., the sub-carriers 1-400) in a multi-carrier signal is large, and a possible transmission capacity of a sub-carrier on a high frequency side (e.g., the sub-carriers 400-1024) is small. When the chirp coefficient $\alpha$ is changed, the distribution of the possible transmission capacity of the sub-carriers is also changed. The possible transmission capacity is expressed by the number of bits transmittable per symbol. Note that the possible transmission capacity corresponds to a transmission quality.

Figure 20A:
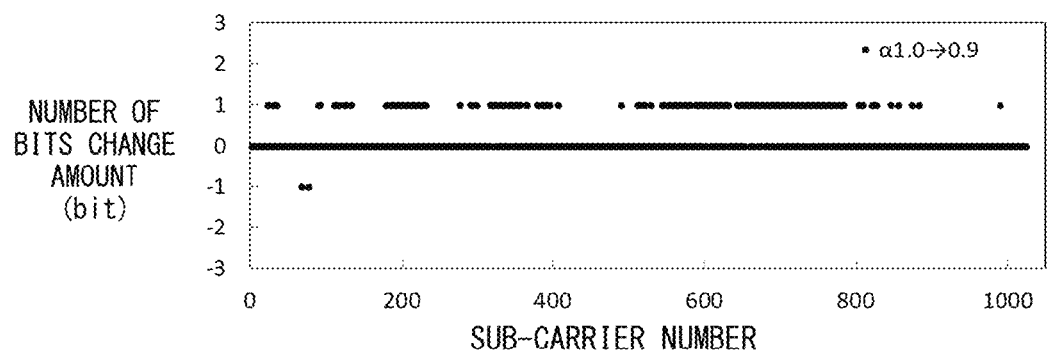
FIGS. 20A and 20B illustrate a change in a possible transmission capacity with respect to a change in chirp.
Figure 20B:
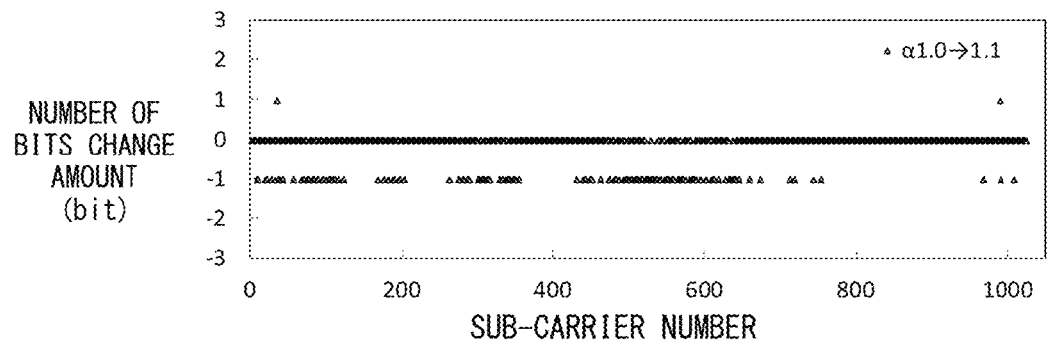

FIGS. 20A and 20B illustrate a change in a possible transmission capacity with respect to a change in chirp. FIG. 20A illustrates a change in the possible transmission capacity when the chirp coefficient $\alpha$ is changed from 1.0 to 0.9, and FIG. 20B illustrates a change in the possible transmission capacity when the chirp coefficient $\alpha$ is changed from 1.0 to 1.1.

In FIG. 20A and FIG. 20B, "number of bit change amount=0" indicates that the possible transmission capacity is not changed even when the chirp is changed. "Number of bit change amount=1" indicates that the number of bits transmittable per symbol is increased by "1" when the chirp is changed. "Number of bit change amount=−1" indicates that the number of bits transmittable per symbol is reduced by "1" when the chirp is changed.

When the chirp coefficient $\alpha$ is changed from 1.0 to 0.9, the possible transmission capacities of many sub-carriers within, for example, the sub-carriers 700-800 become large, as illustrated in FIG. 20A. Namely, in this frequency range, a quality is improved in accordance with a change in the chirp coefficient α. On the other hand, when the chirp coefficient α is changed from 1.0 to 1.1, the possible transmission capacities of many sub-carriers within, for example, the sub-carriers 1-100 become small, as illustrated in FIG. 20B. Namely, in this frequency range, the quality deteriorates in accordance with the change in the chirp coefficient α.

Accordingly, for example, when a sub-carrier with a smaller sub-carrier number (i.e., a sub-carrier of low frequency) is sequentially allocated to respective lanes, the difference in quality between lanes with respect to a change in chirp is likely to be increased. Assume, for example, that the sub-carriers 1-100 are allocated to a lane X. In this case, when the chirp coefficient α is increased, a quality of the lane X (e.g., a bit error rate) is likely to deteriorate compared with that of anther lane.

In view of the foregoing, in the seventh embodiment, the allocation of sub-carriers to respective lanes 1-M is determined such that a change in a transmission quality with respect to the chirp fluctuation is approximately equalized between the lanes 1-M. Namely, the controller 15 collects chirp information indicating a relationship between a chirp change and a change in a possible transmission capacity (e.g., information illustrated in FIGS. 20A and 20B) for each sub-carrier. The chirp information is generated, for example, by measurement or simulation.

The controller 15 allocates sub-carriers to each lane using the collected chirp information. For example, the controller 15 allocates sub-carriers such that the number of sub-carriers whose possible transmission capacity is increased due to the chirp fluctuation (i.e., sub-carriers having a high fluctuation tolerance) is appropriately equalized in the lanes 1-M. Alternatively, the controller 15 may allocate sub-carriers such that the number of sub-carriers whose possible transmission capacity is reduced due to the chirp fluctuation (i.e., sub-carriers having a low fluctuation tolerance) is appropriately equalized in the lanes 1-M.

In the seventh embodiment, a situation in which a quality of a particular lane of a plurality of lanes deteriorates due to the chirp fluctuation is avoided or mitigated. Accordingly, according to the seventh embodiment, communication quality is improved in the entirety of an optical transmission system.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An optical transmitter that converts a plurality of transmission signals transmitted via a plurality of lanes into a multi-carrier signal and transmits the multi-carrier signal, the optical transmitter comprising:
a controller configured to generate allocation information for allocating a specified number of sub-carriers to the plurality of lanes, each having a modulator, according to a bit rate of a transmission signal of each of the lanes, a transmission capacity of each of the sub-carriers, and transmission system information relating to a transmission between the optical transmitter and an optical receiver that receives the multi-carrier signal; and
a signal processor configured to convert the plurality of transmission signals into the multi-carrier signal in accordance with the allocation information generated by the controller, wherein
the transmission system information includes a wavelength of the multi-carrier signal, a type or a performance of each of the modulators, a type or characteristics of an optical fiber implemented between the optical transmitter and the optical receiver, a transmission distance between the optical transmitter and the optical receiver, a loss and a chromatic dispersion of an optical transmission link between the optical transmitter and the optical receiver, the number of optical amplifiers implemented on the optical transmission link, a received optical power at the optical receiver, a signal-to-noise ratio and a cumulative chromatic dispersion detected in the optical receiver or any combination thereof.

2. The optical transmitter according to claim 1, wherein the signal processor includes a plurality of modulators corresponding to the plurality of lanes, a plurality of converters corresponding to the plurality of modulators, and a combiner,
each of the modulators generates a plurality of sub-carrier modulated signals that use the sub-carriers indicated by the allocation information from the transmission signal of the corresponding lane,
each of the converters converts the plurality of sub-carrier modulated signals generated by a corresponding one of the modulators into a time domain signal, and
the combiner combines the time domain signals generated by the plurality of converters to generate the multi-carrier signal.

3. The optical transmitter according to claim 2, wherein the allocation information includes capacity information that indicates a transmission capacity of each of the sub-carriers, and
each of the modulators respectively modulates the sub-carriers indicated by the allocation information with a modulation scheme corresponding to the capacity information to generate the plurality of sub-carrier modulated signals.

4. The optical transmitter according to claim 2, wherein the allocation information includes modulation scheme information that indicates a modulation scheme of each of the sub-carriers, and
each of the modulators respectively modulates the sub-carriers indicated by the allocation information with a modulation scheme indicated by the modulation scheme information to generate the plurality of sub-carrier modulated signals.

5. The optical transmitter according to claim 1, wherein the signal processor includes a plurality of modulators corresponding to the plurality of lanes, a combiner, and a converter,
each of the modulators generates a plurality of sub-carrier modulated signals that use the sub-carriers indicated by the allocation information from the transmission signal of the corresponding lane,
the combiner combines the plurality of sub-carrier modulated signals generated by the plurality of modulators, and
the converter converts an output signal of the combiner into a time domain signal to generate the multi-carrier signal.

6. The optical transmitter according to claim 1, wherein the controller generates the allocation information according to quality information detected in an optical receiver that receives the multi-carrier signal.

7. The optical transmitter according to claim 1, wherein the controller monitors the transmission signals received via the plurality of lanes to detect the bit rate of each of the plurality of lanes.

8. An optical transmitter that converts a plurality of transmission signals transmitted via a plurality of lanes into a multi-carrier signal and transmits the multi-carrier signal, the optical transmitter comprising:
- a controller configured to generate allocation information that indicates an allocation of sub-carriers to the plurality of lanes according to a bit rate of a transmission signal of each of the lanes and a transmission capacity of each of the sub-carriers; and
- a signal processor configured to convert the plurality of transmission signals into the multi-carrier signal in accordance with the allocation information generated by the controller, wherein
- the controller determines the allocation of the sub-carriers to each of the plurality of lanes such that a change in a transmission quality with respect to a chirp fluctuation is approximately equalized between the plurality of lanes.

9. An optical transmission method that converts a plurality of transmission signals transmitted via a plurality of lanes into a multi-carrier signal and transmits the multi-carrier signal, the optical transmission method comprising:
- generating allocation information for allocating a specified number of sub-carriers to the plurality of lanes, each having a modulator, according to a bit rate of a transmission signal of each of the lanes, a transmission capacity of each of the sub-carriers, and transmission system information relating to a transmission between an optical transmitter that transmits the multi-carrier signal and an optical receiver that receives the multi-carrier signal, and
- converting the plurality of transmission signals into the multi-carrier signal in accordance with the allocation information, wherein
- the transmission system information includes a wavelength of the multi-carrier signal, a type or a performance of each of the modulators, a type or characteristics of an optical fiber implemented between the optical transmitter and the optical receiver, a transmission distance between the optical transmitter and the optical receiver, a loss and a chromatic dispersion of an optical transmission link between the optical transmitter and the optical receiver, the number of optical amplifiers implemented on the optical transmission link, a received optical power at the optical receiver, a signal-to-noise ratio and a cumulative chromatic dispersion detected in the optical receiver or any combination thereof.

10. An optical transmitter that converts a plurality of transmission signals transmitted via a plurality of lanes into a multi-carrier signal and transmits the multi-carrier signal, the optical transmitter comprising:
- a controller configured to generate allocation information that indicates an allocation of sub-carriers to the plurality of lanes according to a bit rate of a transmission signal of each of the lanes and a transmission capacity of each of the sub-carriers; and
- a signal processor configured to convert the plurality of transmission signals into the multi-carrier signal in accordance with the allocation information generated by the controller, wherein
- the controller determines the allocation of the sub-carriers to each of the plurality of lanes according to a change in a transmission quality with respect to a chirp fluctuation of the respective sub-carriers.

11. An optical transmitter that converts a plurality of transmission signals transmitted via a plurality of lanes into a multi-carrier signal and transmits the multi-carrier signal, the optical transmitter comprising:
- a controller configured to generate allocation information for allocating a specified number of sub-carriers to the plurality of lanes, each having a modulator, according to a bit rate of a transmission signal of each of the lanes, a transmission capacity of each of the sub-carriers, and transmission system information relating to a transmission between the optical transmitter and an optical receiver that receives the multi-carrier signal; and
- a signal processor configured to convert the plurality of transmission signals into the multi-carrier signal in accordance with the allocation information generated by the controller, wherein
- the transmission system information includes a wavelength of the multi-carrier signal, a type or a performance of each of the modulators, a type or characteristics of an optical fiber implemented between the optical transmitter and the optical receiver, a transmission distance between the optical transmitter and the optical receiver, a loss and a chromatic dispersion of an optical transmission link between the optical transmitter and the optical receiver, the number of optical amplifiers implemented on the optical transmission link, a received optical power at the optical receiver, a signal-to-noise ratio or a cumulative chromatic dispersion detected in the optical receiver or any combination thereof.

* * * * *